US011622353B2

(12) United States Patent
Bhattad et al.

(10) Patent No.: US 11,622,353 B2
(45) Date of Patent: Apr. 4, 2023

(54) AUTONOMOUS UPLINK WITH ANALOG BEAMS

(71) Applicant: QUALCOMM incorporated, San Diego, CA (US)

(72) Inventors: Kapil Bhattad, Bangalore (IN); Jing Sun, San Diego, CA (US); Xiaoxia Zhang, San Diego, CA (US); Yongbin Wei, La Jolla, CA (US); Tamer Kadous, San Diego, CA (US); Srinivas Yerramalli, Hyderabad (IN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 17/166,867

(22) Filed: Feb. 3, 2021

(65) Prior Publication Data

US 2021/0160845 A1   May 27, 2021

Related U.S. Application Data

(62) Division of application No. 16/258,938, filed on Jan. 28, 2019, now Pat. No. 10,939,441.
(Continued)

(51) Int. Cl.
*H04L 5/00* (2006.01)
*H04W 72/044* (2023.01)
(Continued)

(52) U.S. Cl.
CPC ......... *H04W 72/046* (2013.01); *H04L 1/0003* (2013.01); *H04L 5/005* (2013.01);
(Continued)

(58) Field of Classification Search
None
See application file for complete search history.

(56) References Cited

U.S. PATENT DOCUMENTS 9,094,942 B2 * 7/2015 Wiberg ............ H04W 74/0833
10,111,190 B2 * 10/2018 Pelletier ............ H04W 52/246
(Continued)

FOREIGN PATENT DOCUMENTS

| EP | 3444958 A1 | 2/2019 |
|---|---|---|
| WO | WO2017099867 A1 | 6/2017 |
| WO | WO2017222132 A1 | 12/2017 |

OTHER PUBLICATIONS

International Preliminary Report on Patentability—PCT/US2019/015667, The International Bureau of WIPO—Geneva, Switzerland, dated Aug. 13, 2020.
(Continued)

*Primary Examiner* — Sithu Ko
(74) *Attorney, Agent, or Firm* — Holland & Hart LLP

(57) ABSTRACT

A base station may configure a set of autonomous uplink (AUL) resources for a specific base station receive beam, or the AUL resources may be configured for specific user equipment (UEs) or user groups. Additionally, the AUL resources may be configured to include a sensing portion, a data portion, or both. As an example, a UE may receive an AUL configuration that includes an indication of a set of AUL resources that are specific to a base station receive beam. The UE may then determine that the set of AUL resources is available and perform an AUL transmission of uplink data using the set of beam-specific AUL resources. Additionally or alternatively, the UE may perform the AUL transmission with respective portions that include a sensing signal and the uplink data. The base station may use the sensing signal to determine a receive beam on which to receive the uplink data.

24 Claims, 19 Drawing Sheets

Related U.S. Application Data

(60) Provisional application No. 62/624,229, filed on Jan. 31, 2018.

(51) Int. Cl.
| | |
|---|---|
| *H04W 76/11* | (2018.01) |
| *H04W 24/08* | (2009.01) |
| *H04W 72/04* | (2023.01) |
| *H04L 1/00* | (2006.01) |
| *H04W 76/27* | (2018.01) |
| *H04W 74/08* | (2009.01) |
| *H04W 74/00* | (2009.01) |
| *H04B 7/08* | (2006.01) |
| *H04B 7/06* | (2006.01) |

(52) U.S. Cl.
CPC ......... *H04W 24/08* (2013.01); *H04W 72/042* (2013.01); *H04W 74/08* (2013.01); *H04W 76/11* (2018.02); *H04W 76/27* (2018.02); *H04B 7/0695* (2013.01); *H04B 7/088* (2013.01); *H04W 74/006* (2013.01)

(56) References Cited

U.S. PATENT DOCUMENTS

| | | | |
|---|---|---|---|
| 10,708,851 B2* | 7/2020 | Karaki | H04W 8/005 |
| 11,291,044 B2* | 3/2022 | Li | H04W 74/006 |
| 2008/0109041 A1 | 5/2008 | De Voir | |
| 2012/0314619 A1 | 12/2012 | Wiberg et al. | |
| 2013/0301531 A1 | 11/2013 | Tao | |
| 2015/0382205 A1 | 12/2015 | Lee et al. | |
| 2017/0150424 A1 | 5/2017 | Lee et al. | |
| 2017/0171855 A1* | 6/2017 | Sundararajan | H04W 72/0413 |
| 2017/0171859 A1* | 6/2017 | Nimbalker | H04W 72/042 |
| 2017/0230838 A1* | 8/2017 | Yerramalli | H04W 72/042 |
| 2017/0367120 A1* | 12/2017 | Murray | H04W 74/0833 |
| 2018/0077720 A1* | 3/2018 | Wang | H04W 72/1247 |
| 2018/0199381 A1* | 7/2018 | Rong | H04W 72/0413 |
| 2018/0206246 A1* | 7/2018 | Zhang | H04L 1/1896 |
| 2018/0359790 A1 | 12/2018 | Ingale et al. | |
| 2019/0110310 A1* | 4/2019 | Obregon | H04W 74/02 |
| 2019/0141731 A1 | 5/2019 | Yoshimoto et al. | |
| 2019/0208547 A1* | 7/2019 | Koskela | H04W 24/10 |
| 2019/0230578 A1 | 7/2019 | Karaki et al. | |
| 2019/0239202 A1 | 8/2019 | Bhattad et al. | |
| 2020/0112993 A1 | 4/2020 | Tsai et al. | |

OTHER PUBLICATIONS

International Search Report and Written Opinion—PCT/US2019/015667—ISA/EPO—dated Apr. 11, 2019.
NOKIA: "Summary of Email Discussion [90b-LTE-19] on AUL resource Allocation", 3GPP Draft; R1-1719850 Email Discussion 90b-LTE-19 Summary, 3rd Generation Partnership Project (3GPP), Mobile Competence Centre; 650, Route Des Lucioles; F-06921 Sophia-Antipolis Cedex ; France vol. RAN WG1, No. Reno, NV, US; Nov. 27, 2017-Dec. 1, 2017 Nov. 17, 2017, XP051368877, Retrieved from the Internet: URL:http://www.3gpp.org/ftp/tsg%5Fran/WG1%5FRL1/TSGR1%5F91/Docs/ [retrieved on Nov. 17, 2017], 8 pages.

* cited by examiner

AUTONOMOUS UPLINK WITH ANALOG BEAMS

CROSS REFERENCES

The present Application for Patent claims priority to U.S. patent application Ser. No. 16/258,938 by Bhattad et al, entitled "AUTONOMOUS UPLINK WITH ANALOG BEAMS," filed Jan. 28, 2019, which claims the benefit of U.S. Provisional Patent Application No. 62/624,229 by Bhattad et al., entitled "AUTONOMOUS UPLINK WITH ANALOG BEAMS," filed Jan. 31, 2018, assigned to the assignee hereof, and expressly incorporated by reference in its entirety.

BACKGROUND

The following relates generally to wireless communication, and more specifically to autonomous uplink (AUL) with analog beams.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices (e.g., base stations, UEs, etc.) may communicate using directional transmissions (e.g., beams), in which beamforming techniques may be applied using one or more antenna elements to form a beam in a particular direction. In such systems, a base station may schedule uplink transmissions for a UE on a set of resources, and the base station may then listen in a direction of the UE's scheduled transmission, for example, by forming a receive beam in that direction. However, in the case of AUL (e.g., grantless or unscheduled) transmissions, the base station may not be aware of the direction (and corresponding receive beam) in which to listen for the UE's directional transmission, resulting in missed uplink data and inefficiencies in managing AUL transmissions from the UE.

SUMMARY

The described techniques relate to improved methods, systems, devices, or apparatuses that support autonomous uplink (AUL) with analog beams. Generally, the described techniques provide for the configuration of resources for AUL transmissions by a user equipment (UE). For example, a base station may configure a set of AUL resources for a specific base station receive beam, or AUL resources may be configured for specific UEs or user groups. Additionally, the AUL resources may be configured to include different portions, such as a sensing portion (e.g., including an AUL indicator), a data portion, or both. The use of the configured AUL resources may enable AUL transmissions by a UE with minimal overhead, and the base station may efficiently determine a receive beam for receiving uplink data from the UE in accordance with the AUL configuration.

As an example, a UE may receive an AUL configuration that includes an indication of a set of AUL resources that are specific to an AUL receive beam at a base station. The UE may then determine that the set of AUL resources is available and perform an AUL transmission of uplink data to the base station using the set of beam-specific AUL resources. Because the set of AUL resources may be specific to an AUL receive beam, the base station may receive the AUL transmission in accordance with the AUL configuration (e.g., on the base station receive beam corresponding to the AUL resources). Additionally or alternatively, after receiving a UE-specific AUL configuration, the UE may perform an AUL transmission that includes a first portion including a sensing signal and a second portion including the uplink data. The base station may then use the sensing signal to determine a suitable receive beam to receive the uplink data in the AUL transmission. In some examples, the UE may receive a trigger signal from the base station that indicates whether the set of AUL resources are available for an AUL transmission.

A method for wireless communication is described. The method may include receiving, from a base station, an AUL configuration including an indication of a set of AUL resources for a UE, where the set of AUL resources is specific to an AUL receive beam of the base station, identifying uplink data for an AUL transmission to the base station, determining whether the set of beam-specific AUL resources is available for the AUL transmission by the UE, and performing an AUL transmission of the uplink data to the base station using the set of beam-specific AUL resources based on a determination that the set of beam-specific AUL resources is available for the AUL transmission.

An apparatus for wireless communication is described. The apparatus may include means for receiving, from a base station, an AUL configuration including an indication of a set of AUL resources for a UE, where the set of AUL resources is specific to an AUL receive beam of the base station, means for identifying uplink data for an AUL transmission to the base station, means for determining whether the set of beam-specific AUL resources is available for the AUL transmission by the UE, and means for performing an AUL transmission of the uplink data to the base station using the set of beam-specific AUL resources based on a determination that the set of beam-specific AUL resources is available for the AUL transmission.

Another apparatus for wireless communication is described. The apparatus may include a processor, memory in electronic communication with the processor, and instructions stored in the memory. The instructions may be operable to cause the processor to receive, from a base station, an AUL configuration including an indication of a set of AUL resources for a UE, where the set of AUL resources is specific to an AUL receive beam of the base station, identify uplink data for an AUL transmission to the base station, determine whether the set of beam-specific AUL resources is available for the AUL transmission by the UE, and perform an AUL transmission of the uplink data to the base station using the set of beam-specific AUL resources based on a determination that the set of beam-specific AUL resources is available for the AUL transmission.

A non-transitory computer-readable medium for wireless communication is described. The non-transitory computer-readable medium may include instructions operable to cause a processor to receive, from a base station, an AUL configuration including an indication of a set of AUL resources for a UE, where the set of AUL resources is specific to an AUL receive beam of the base station, identify uplink data for an AUL transmission to the base station, determine whether the set of beam-specific AUL resources is available for the AUL transmission by the UE, and perform an AUL transmission of the uplink data to the base station using the set of beam-specific AUL resources based on a determination that the set of beam-specific AUL resources is available for the AUL transmission.

Some examples of the method, apparatus, and non-transitory computer-readable medium described herein may further include processes, features, means, or instructions for receiving, from a base station, a trigger signal associated with the set of beam-specific AUL resources. Some examples of the method, apparatus, and non-transitory computer-readable medium described herein may further include processes, features, means, or instructions for determining that the set of beam-specific AUL resources may be available for the AUL transmission by a UE based on the trigger signal, where the AUL transmission may be performed based on the received trigger signal.

In some examples of the method, apparatus, and non-transitory computer-readable medium described herein, determining that the set of beam-specific AUL resources may be available for the AUL transmission includes determining that the set of beam-specific AUL resources may be available based on a signal strength of the trigger signal satisfying a threshold.

In some examples of the method, apparatus, and non-transitory computer-readable medium described herein, determining that the set of beam-specific AUL resources may be available for the AUL transmission includes determining that the set of beam-specific AUL resources may be available for the AUL transmission based on the presence of a trigger signal or an absence of the trigger signal.

In some examples of the method, apparatus, and non-transitory computer-readable medium described herein, determining that the set of beam-specific AUL resources may be available for the AUL transmission includes decoding the trigger signal. Some examples of the method, apparatus, and non-transitory computer-readable medium described herein may further include processes, features, means, or instructions for determining that the set of beam-specific AUL resources may be available for the AUL transmission based on the decoding.

In some examples of the method, apparatus, and non-transitory computer-readable medium described herein, the trigger signal includes one or more of: radio resource control (RRC) messaging, downlink control information (DCI), downlink messaging, a physical downlink control channel (PDCCH), a reference signal, or signaling within a synchronization signal burst.

In some examples of the method, apparatus, and non-transitory computer-readable medium described herein, the PDCCH indicates a subset of AUL resources that may be available within the set of beam-specific AUL resources. In some examples of the method, apparatus, and non-transitory computer-readable medium described herein, the PDCCH indicates a second trigger signal associated with the set of beam-specific AUL resources, where the second trigger signal may be used to determine whether the set of beam-specific AUL resources may be available for the AUL transmission by the UE.

In some examples of the method, apparatus, and non-transitory computer-readable medium described herein, the second trigger signal includes a second reference signal, or signaling within a synchronization signal burst, or a combination thereof. In some examples of the method, apparatus, and non-transitory computer-readable medium described herein, the set of beam-specific AUL resources may be time division multiplexed (TDM) with a second set of AUL resources, where the second set of AUL resources may be specific to a second AUL receive beam of the base station.

In some examples of the method, apparatus, and non-transitory computer-readable medium described herein, the AUL transmission includes a first portion and a second portion, the first portion being non-overlapping with a portion of a second set of AUL resources and the second portion at least partially overlapping with the second set of AUL resources, where the second set of AUL resources may be specific to a second AUL receive beam of the base station.

In some examples of the method, apparatus, and non-transitory computer-readable medium described herein, performing the AUL transmission may include transmitting the uplink data within the first portion and the second portion, and transmitting an AUL indicator within the first portion, where the AUL indicator may be multiplexed with the uplink data. In some examples of the method, apparatus, and non-transitory computer-readable medium described herein, the AUL indicator serves as a demodulation reference signal (DMRS) for the uplink data.

In some examples of the method, apparatus, and non-transitory computer-readable medium described herein, the AUL indicator includes transmission information including an indication of a priority of the uplink data, a waveform for a physical uplink shared channel (PUSCH), a modulation and coding scheme (MCS), a redundancy version (RV), a time/frequency resource allocation for a subsequent uplink data transmission, UE identity information, transmit beam information, an indication of a preferred receive beam to be used to receive AUL transmissions, or a combination thereof.

In some examples of the method, apparatus, and non-transitory computer-readable medium described herein, the transmission information may be at least partially carried through a scrambling code associated with the AUL indicator, an orthogonal cover code associated with the AUL indicator, a cyclic shift associated with the AUL indicator, a frequency comb associated with the AUL indicator, or a combination thereof.

In some examples of the method, apparatus, and non-transitory computer-readable medium described herein, receiving the AUL configuration includes: receiving one or more of: an RRC message constituting the AUL configuration, a DCI constituting the AUL configuration, or a trigger signal constituting the AUL configuration.

In some examples of the method, apparatus, and non-transitory computer-readable medium described herein, the AUL configuration includes a trigger signal configuration, the trigger signal configuration used to determine time/frequency resources associated with a trigger signal and to process the trigger signal. In some examples of the method, apparatus, and non-transitory computer-readable medium described herein, the AUL receive beam includes a millimeter wave (mmW) communications beam.

A method for wireless communication is described. The method may include identifying a set of AUL resources for a UE, determining an AUL configuration for the set of AUL resources and one or more AUL receive beams of a base station, where the set of AUL resources is specific to an AUL receive beam of the base station, transmitting, to the UE, the AUL configuration including an indication of the set of beam-specific AUL resources, and receiving an AUL transmission from the UE in accordance with the AUL configuration, where the AUL transmission is received using the set of beam-specific AUL resources and the AUL receive beam.

An apparatus for wireless communication is described. The apparatus may include means for identifying a set of AUL resources for a UE, means for determining an AUL configuration for the set of AUL resources and one or more AUL receive beams of a base station, where the set of AUL resources is specific to an AUL receive beam of the base station, means for transmitting, to the UE, the AUL configuration including an indication of the set of beam-specific AUL resources, and means for receiving an AUL transmission from the UE in accordance with the AUL configuration, where the AUL transmission is received using the set of beam-specific AUL resources and the AUL receive beam.

Another apparatus for wireless communication is described. The apparatus may include a processor, memory in electronic communication with the processor, and instructions stored in the memory. The instructions may be operable to cause the processor to identify a set of AUL resources for a UE, determine an AUL configuration for the set of AUL resources and one or more AUL receive beams of a base station, where the set of AUL resources is specific to an AUL receive beam of the base station, transmit, to the UE, the AUL configuration including an indication of the set of beam-specific AUL resources, and receive an AUL transmission from the UE in accordance with the AUL configuration, where the AUL transmission is received using the set of beam-specific AUL resources and the AUL receive beam.

A non-transitory computer-readable medium for wireless communication is described. The non-transitory computer-readable medium may include instructions operable to cause a processor to identify a set of AUL resources for a UE, determine an AUL configuration for the set of AUL resources and one or more AUL receive beams of a base station, where the set of AUL resources is specific to an AUL receive beam of the base station, transmit, to the UE, the AUL configuration including an indication of the set of beam-specific AUL resources, and receive an AUL transmission from the UE in accordance with the AUL configuration, where the AUL transmission is received using the set of beam-specific AUL resources and the AUL receive beam.

In some examples of the method, apparatus, and non-transitory computer-readable medium described herein, transmitting the AUL configuration includes: transmitting one or more of: a RRC message constituting the AUL configuration, DCI constituting the AUL configuration, or a trigger signal constituting the AUL configuration.

Some examples of the method, apparatus, and non-transitory computer-readable medium described herein may further include processes, features, means, or instructions for determining that the set of beam-specific AUL resources may be available for AUL transmissions by the UE. Some examples of the method, apparatus, and non-transitory computer-readable medium described herein may further include processes, features, means, or instructions for transmitting a trigger signal including an indication that the set of beam-specific AUL resources may be available for the AUL transmissions based on the determination that the set of beam-specific AUL resources may be available.

Some examples of the method, apparatus, and non-transitory computer-readable medium described herein may further include processes, features, means, or instructions for transmitting the trigger signal using a transmit beam corresponding to the AUL receive beam. In some examples of the method, apparatus, and non-transitory computer-readable medium described herein, the trigger signal includes RRC messaging, DCI, downlink messaging, a PDCCH, a reference signal, a synchronization signal burst, or a combination thereof.

Some examples of the method, apparatus, and non-transitory computer-readable medium described herein may further include processes, features, means, or instructions for transmitting, within the AUL configuration, a trigger signal configuration, where the trigger signal configuration includes an indication of time/frequency resources associated with a trigger signal and information for processing the trigger signal.

Some examples of the method, apparatus, and non-transitory computer-readable medium described herein may further include processes, features, means, or instructions for configuring the set of beam-specific AUL resources to be time division multiplexed with a second set of AUL resources, where the second set of AUL resources may be specific to a second AUL receive beam of the base station.

Some examples of the method, apparatus, and non-transitory computer-readable medium described herein may further include processes, features, means, or instructions for configuring the set of beam-specific AUL resources to include a first portion and a second portion, the first portion being non-overlapping with a portion of a second set of AUL resources and the second portion at least partially overlapping with the second set of AUL resources, where the second set of AUL resources may be specific to a second AUL receive beam of the base station.

Some examples of the method, apparatus, and non-transitory computer-readable medium described herein may further include processes, features, means, or instructions for receiving, from the UE, an AUL indicator within the first portion of the AUL transmission, where the AUL indicator may be multiplexed with the uplink data in the first portion of the set of beam-specific AUL resources.

In some examples of the method, apparatus, and non-transitory computer-readable medium described herein, the AUL indicator includes an indication of a priority of the uplink data, a waveform for a PUSCH, an MCS, an RV, a time/frequency resource allocation for a subsequent uplink data transmission, UE identity information, transmit beam information, an indication of a preferred receive beam to be used to receive AUL transmissions, or a combination thereof.

A method for wireless communication is described. The method may include receiving, from a base station, an AUL configuration including an indication of a set of AUL resources for a UE, identifying uplink data for an AUL transmission to a base station, and performing the AUL transmission using the set of AUL resources, where a first portion of the AUL transmission includes a sensing signal and a second portion of the AUL transmission includes the uplink data.

An apparatus for wireless communication is described. The apparatus may include means for receiving, from a base station, an AUL configuration including an indication of a set of AUL resources for a UE, means for identifying uplink data for an AUL transmission to the base station, and means for performing the AUL transmission using the set of AUL resources, where a first portion of the AUL transmission includes a sensing signal and a second portion of the AUL transmission includes the uplink data.

Another apparatus for wireless communication is described. The apparatus may include a processor, memory in electronic communication with the processor, and instructions stored in the memory. The instructions may be operable to cause the processor to receive, from a base station, an AUL configuration including an indication of a set of AUL resources for a UE, identify uplink data for an AUL transmission to the base station, and perform the AUL transmission using the set of AUL resources, where a first portion of the AUL transmission includes a sensing signal and a second portion of the AUL transmission includes the uplink data.

A non-transitory computer-readable medium for wireless communication is described. The non-transitory computer-readable medium may include instructions operable to cause a processor to receive, from a base station, an AUL configuration including an indication of a set of AUL resources for a UE, identify uplink data for an AUL transmission to the base station, and perform the AUL transmission using the set of AUL resources, where a first portion of the AUL transmission includes a sensing signal and a second portion of the AUL transmission includes the uplink data.

In some examples of the method, apparatus, and non-transitory computer-readable medium described herein, performing the AUL transmission includes: performing the AUL transmission with one or more repetitions of the uplink data on the set of AUL resources. In some examples of the method, apparatus, and non-transitory computer-readable medium described herein, performing the AUL transmission includes: performing the AUL transmission with one or more reference signals within the first portion of the AUL transmission, the sensing signal constituting the one or more reference signals.

In some examples of the method, apparatus, and non-transitory computer-readable medium described herein, the one or more reference signals comprise a sounding reference signal (SRS), or a DMRS, or a combination thereof. In some examples of the method, apparatus, and non-transitory computer-readable medium described herein, the first portion of the AUL transmission may be time division multiplexed with the second portion, and where the uplink data includes one or more additional reference signals.

Some examples of the method, apparatus, and non-transitory computer-readable medium described herein may further include processes, features, means, or instructions for receiving, in response to the transmitted sensing signal, a trigger signal including an indication that the set of AUL resources may be available for AUL transmissions by the UE. Some examples of the method, apparatus, and non-transitory computer-readable medium described herein may further include processes, features, means, or instructions for performing the AUL transmission based on the received trigger signal.

In some examples of the method, apparatus, and non-transitory computer-readable medium described herein, the trigger signal includes a sensing resource identifier, UE identity information, a beam identity, uplink resource allocation corresponding to a set of beams, a waveform to use for a PUSCH, or a combination thereof.

In some examples of the method, apparatus, and non-transitory computer-readable medium described herein, the sensing signal includes an AUL indicator that includes transmission information including an indication of a priority of the uplink data, a waveform for a PUSCH, an MCS, an RV, a time/frequency resource allocation for a subsequent data transmission, UE identity information, transmit beam information, an indication of a receive beam to be used to receive the AUL transmission, or a combination thereof.

In some examples of the method, apparatus, and non-transitory computer-readable medium described herein, the transmission information may be at least partially carried through a scrambling code associated with the AUL indicator, an orthogonal cover code associated with the AUL indicator, a cyclic shift associated with the AUL indicator, a frequency comb associated with the AUL indicator, or a combination thereof.

A method for wireless communication is described. The method may include transmitting, to a UE, an AUL configuration including an indication of a set of AUL resources for the UE, receiving, from the UE, an AUL transmission on the set of AUL resources, where a first portion of the AUL transmission includes a sensing signal and a second portion of the AUL transmission includes uplink data, and determining an AUL receive beam for receiving the second portion of the AUL transmission, the AUL receive beam corresponding to the set of AUL resources, where the AUL receive beam is determined based on the sensing signal.

An apparatus for wireless communication is described. The apparatus may include means for transmitting, to a UE, an AUL configuration including an indication of a set of AUL resources for the UE, means for receiving, from the UE, an AUL transmission on the set of AUL resources, where a first portion of the AUL transmission includes a sensing signal and a second portion of the AUL transmission includes uplink data, and means for determining an AUL receive beam for receiving the second portion of the AUL transmission, the AUL receive beam corresponding to the set of AUL resources, where the AUL receive beam is determined based on the sensing signal.

Another apparatus for wireless communication is described. The apparatus may include a processor, memory in electronic communication with the processor, and instructions stored in the memory. The instructions may be operable to cause the processor to transmit, to a UE, an AUL configuration including an indication of a set of AUL resources for the UE, receive, from the UE, an AUL transmission on the set of AUL resources, where a first portion of the AUL transmission includes a sensing signal and a second portion of the AUL transmission includes uplink data, and determine an AUL receive beam for receiving the second portion of the AUL transmission, the AUL receive beam corresponding to the set of AUL resources, where the AUL receive beam is determined based on the sensing signal.

A non-transitory computer-readable medium for wireless communication is described. The non-transitory computer-readable medium may include instructions operable to cause a processor to transmit, to a UE, an AUL configuration including an indication of a set of AUL resources for the UE, receive, from the UE, an AUL transmission on the set of AUL resources, where a first portion of the AUL transmission includes a sensing signal and a second portion of the AUL transmission includes uplink data, and determine an AUL receive beam for receiving the second portion of the AUL transmission, the AUL receive beam corresponding to the set of AUL resources, where the AUL receive beam is determined based on the sensing signal.

Some examples of the method, apparatus, and non-transitory computer-readable medium described herein may further include processes, features, means, or instructions for monitoring for one or more sensing signals corresponding to a set of AUL beams, where a plurality of beam directions may be monitored in the first portion of the AUL transmission. Some examples of the method, apparatus, and non-transitory computer-readable medium described herein may further include processes, features, means, or instructions for determining the AUL receive beam for receiving the second portion of the AUL transmission based on the monitoring.

Some examples of the method, apparatus, and non-transitory computer-readable medium described herein may further include processes, features, means, or instructions for monitoring for one or more sensing signals corresponding to a set of AUL beams, where a different beam direction may be monitored in respective time division multiplexed portions of the AUL transmission. Some examples of the method, apparatus, and non-transitory computer-readable medium described herein may further include processes, features, means, or instructions for determining the AUL receive beam for receiving the second portion of the AUL transmission based on the monitoring.

Some examples of the method, apparatus, and non-transitory computer-readable medium described herein may further include processes, features, means, or instructions for transmitting, in response to the received sensing signal, a trigger signal including an indication that the set of AUL resources may be available for AUL transmissions. Some examples of the method, apparatus, and non-transitory computer-readable medium described herein may further include processes, features, means, or instructions for receiving the AUL transmission based on the transmitted trigger signal.

In some examples of the method, apparatus, and non-transitory computer-readable medium described herein, the trigger signal may be transmitted using a transmit beam that corresponds to the AUL receive beam for receiving the second portion of the AUL transmission. In some examples of the method, apparatus, and non-transitory computer-readable medium described herein, the trigger signal includes a sensing resource identifier, UE identify information, a beam identity, uplink resource allocation corresponding to a set of beams, a waveform to use for a PUSCH, or a combination thereof.

In some examples of the method, apparatus, and non-transitory computer-readable medium described herein, the AUL transmission includes one or more repetitions of the uplink data on the set of AUL resources. In some examples of the method, apparatus, and non-transitory computer-readable medium described herein, the sensing signal includes one or more reference signals transmitted within the first portion of the AUL transmission. In some examples of the method, apparatus, and non-transitory computer-readable medium described herein, the first portion of the AUL transmission may be time division multiplexed with the second portion, and where the uplink data includes one or more additional reference signals.

In some examples of the method, apparatus, and non-transitory computer-readable medium described herein, the sensing signal includes an AUL indicator that includes transmission information including an indication of a priority of the uplink data, a waveform for a PUSCH, an MCS, an RV, a time/frequency resource allocation for a subsequent data transmission, UE identity information, transmit beam information, an indication of a receive beam to be used to receive the AUL transmission, or a combination thereof.

DETAILED DESCRIPTION

Figure 1:
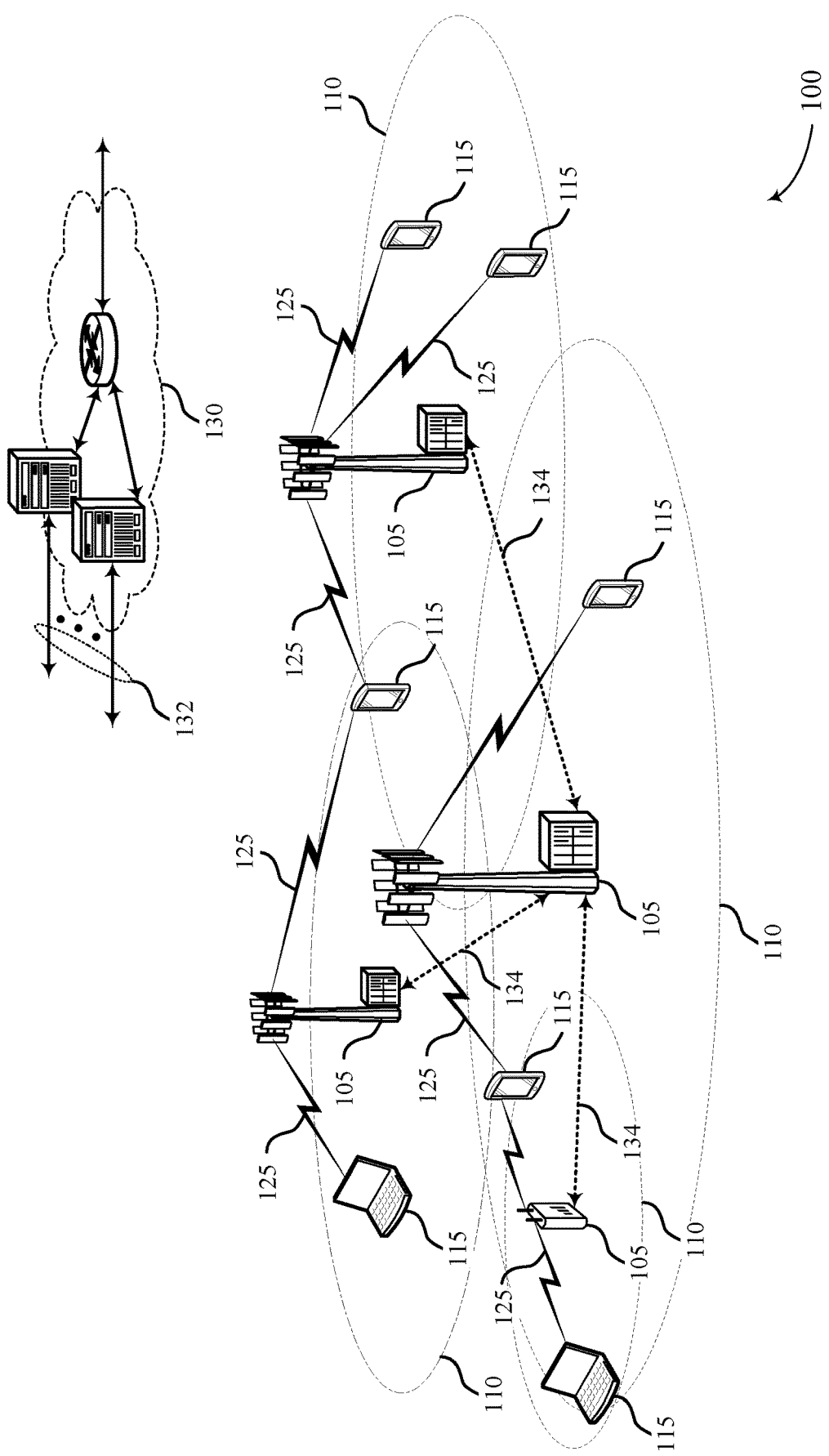
FIG. 1 illustrates an example of a wireless communications system that supports autonomous uplink (AUL) with analog beams in accordance with aspects of the present disclosure.

Some wireless communication systems may operate in millimeter wave (mmW) frequency ranges, e.g., 28 gigahertz (GHz), 40 GHz, 60 GHz. Wireless communication at these frequencies may be associated with increased signal attenuation (e.g., path loss), which may be influenced by various factors, such as temperature, barometric pressure, diffraction, etc. As a result, transmissions may be beamformed to overcome the path loss experienced at these frequencies. Wireless devices within such systems may accordingly communicate via these directional beams (e.g., beamformed for transmission and reception using an antenna array at the wireless device). For example, a base station and a user equipment (UE) may communicate via beam pair links (BPLs), each BPL including a transmit beam of one wireless node (e.g., a UE) and a receive beam of a second wireless node (e.g., a base station).

A base station and a UE may communicate using uplink transmissions from the UE to the base station and downlink transmissions from the base station to the UE. An uplink transmission may be scheduled by sending the UE an uplink grant, which signals to the UE that it may transmit uplink data on configured or scheduled resources. However, a UE may also have an ability to perform an autonomous uplink (AUL) transmission (e.g., a grantless or unscheduled transmission) of an uplink message. AUL may refer to the process by which a UE transmits uplink signals to a base station without having to first receive an uplink grant, and AUL functionality may be configured using radio resource control (RRC) messaging.

In some cases, multiple UEs may share time-domain AUL resources, allowing a corresponding base station to receive multiple AUL transmissions simultaneously (e.g., from different UEs in different directions). However, the base station may only have the capacity to receive using one beam at a time, or the base station may receive a transmission on a certain beam only when it is monitoring that beam's path (e.g., in a particular direction using a corresponding receive beam). In some cases, although the same AUL resources may be configured for multiple UEs, no UEs may be transmitting uplink data or only one UE may be transmitting uplink data. The base station may thus not be aware of an AUL transmission on a certain beam or may not be aware that a UE is performing an AUL transmission. Consequently, the base station may miss AUL transmissions, for example, if monitoring for or receiving other transmissions in a different direction. Additionally, different AUL resources may be allocated for different beams. But due to a potentially large number of beams, this allocation may increase overhead significantly. In such cases, AUL may become costly to support, as a base station may need to coordinate tuning of a specific receive beam during the time that respective UEs are configured with AUL resources. Further, other UEs may not be able to utilize the AUL resource during this time if the base station is already busy monitoring for uplink traffic on the receive beam associated with the AUL resources.

As described herein, AUL resources may be configured such that a base station may coherently receive AUL transmissions from various UEs while simultaneously minimizing overhead. For example, a base station may configure a first set of AUL resources for a first beam, a second set of AUL resources for a second beam, and so on. That is, the base station may configure AUL resources in a beam-specific manner. The base station may semi-statically or dynamically provide this configuration information to UEs to allow the UEs to utilize the AUL resources on various beams. Accordingly, the base station may coherently monitor for AUL transmissions on the configured AUL resources for respective beams.

Additionally or alternatively, a base station may configure AUL resources in a user-specific manner. For instance, a base station may configure a first set of AUL resources for a first UE, a second set of AUL resources for a second UE, and so on. In such cases, the UE may determine which transmit beam to use for AUL transmission. The UE may repeatedly transmit a data portion of an AUL resource until a base station receives the transmission. Additionally or alternatively, the UE may transmit a sensing portion of an AUL resource so that the base station can tune its receive beam(s) in the corresponding direction responsive to a sensing signal included in the sensing portion. In some cases, a base station may transmit a downlink trigger signal indicating which transmit beam the UE may use for AUL transmission.

Aspects of the disclosure are initially described in the context of a wireless communications system. Further examples are provided that illustrate configured AUL resources used for AUL transmissions. Aspects of the disclosure are further illustrated by and described with reference to apparatus diagrams, system diagrams, and flowcharts that relate to AUL with analog beams.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support AUL resource configurations used for AUL transmissions with reduced overhead.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or some other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, an SFN, and a physical HARQ indicator channel (PHICH) configuration. After decoding the MIB, the UE 115 may receive one or more Ms. For example, SIB1 may contain cell access parameters and scheduling information for other Ms. Decoding SIB1 may enable the UE 115 to receive SIB2. SIB2 may contain RRC configuration information related to random access channel (RACH) procedures, paging, PUCCH, physical uplink shared channel (PUSCH), power control, sounding reference signal (SRS), and cell barring. In some cases, a base station 105 may transmit synchronization signals (SSs) (e.g., PSS SSS, and the like) using multiple beams in a beam-sweeping manner through a cell coverage area. For example, PSS, SSS, and/or broadcast information (e.g., a PBCH) may be transmitted within different SS blocks on respective directional beams, where one or more SS blocks may be included within an SS burst. In some cases, these SSs and RSs may be transmitted at different times and/or using different beams.

A base station 105 may insert periodic pilot symbols such as a cell-specific reference signal (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the geographic coverage area 110 of the base station 105, demodulation reference signal (DMRS) may be directed toward specific UEs 115 and may be transmitted only on resource blocks assigned to those UEs 115. DMRS may include signals on 6 resource elements in each resource block in which they are transmitted. The DMRS for different antenna ports may each utilize the same 6 resource elements and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating channel state information (CSI). On the uplink, a UE 115 may transmit a combination of periodic SRS and uplink DMRS for link adaptation and demodulation, respectively.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), TDD, or a combination of both. In some cases, a UE 115 may perform an LBT procedure prior to performing an AUL transmission.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array, such that the signals propagating at particular orientations with respect to an antenna array experience constructive interference while others experience destructive interference. The adjustment of signals communicated via the antenna elements may include a transmitting device or a receiving device, applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Downlink control information (DCI), including HARQ information, is transmitted in a physical downlink control channel (PDCCH) carries DCI in at least one control channel elements CCE, which may consist of nine logically contiguous resource element groups (REGs), where each REG contains 4 resource elements. DCI includes information regarding downlink scheduling assignments, uplink resource grants, transmission scheme, uplink power control, HARQ information, modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI includes additional signaling information. DCI size and format depend on the amount of information as well as factors such as bandwidth, the number of antenna ports, and duplexing mode.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.)

at reduced symbol durations (e.g., 16.67 microseconds (μs)). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support the configuration of resources for AUL transmissions by a UE 115. For example, a base station 105 may configure a set of AUL resources that are specific to a base station receive beam, or the AUL resources may be configured for specific UEs 115 or user groups. Additionally, the AUL resources may be configured to include a sensing portion (e.g., including an AUL indicator), a data portion, or both. The use of the configured AUL resources may enable AUL transmissions by a UE 115 with minimal overhead, and the base station 105 may efficiently determine a receive beam for receiving the uplink data from the UE 115 in accordance with the AUL configuration.

As an example, a UE 115 may receive an AUL configuration that includes an indication of a set of AUL resources that are specific to an AUL receive beam at the base station 105. The UE 115 may then determine that the set of AUL resources is available and perform an AUL transmission of uplink data to the base station 105 using the set of beam-specific AUL resources. Because the set of AUL resources may be specific to the AUL receive beam, the base station 105 may receive the AUL transmission in accordance with the AUL configuration (e.g., on a base station receive beam corresponding to the AUL resources). Additionally or alternatively, after receiving a UE-specific AUL configuration, the UE 115 may perform the AUL transmission that includes a first portion for a sensing signal and a second portion for the uplink data. The base station 105 may use the sensing signal to determine a suitable receive beam to receive the uplink data in the AUL transmission. In some examples, the UE 115 may receive a trigger signal from the base station 105 that indicates whether the set of AUL resources are available for an AUL transmission.

Figure 2:
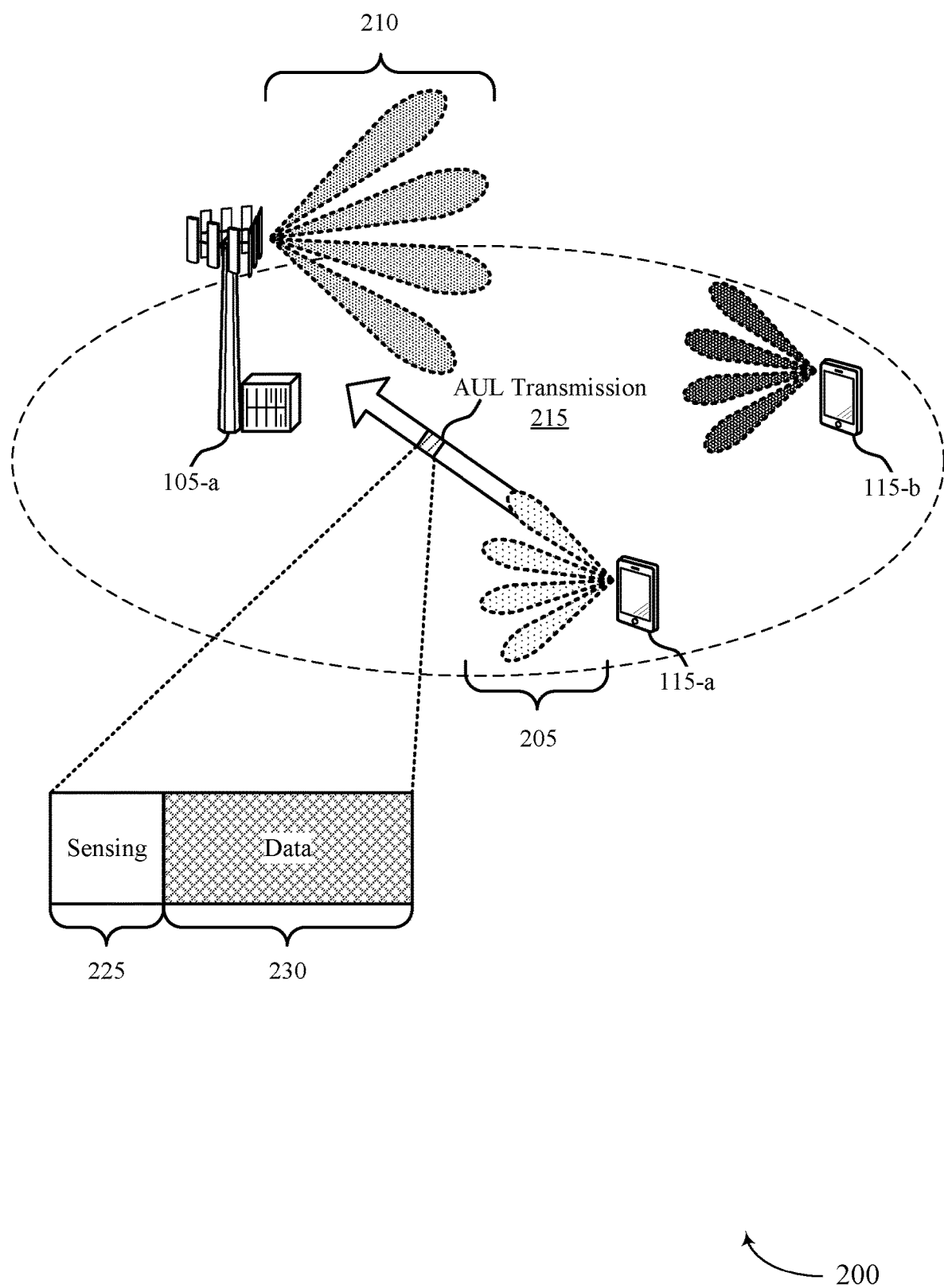
FIG. 2 illustrates an example of a wireless communications system that supports AUL with analog beams in accordance with aspects of the present disclosure.

FIG. 2 illustrates an example of a wireless communications system 200 that supports AUL with analog beams in accordance with various aspects of the present disclosure. In some examples, wireless communications system 200 may implement aspects of wireless communications system 100. For example, wireless communications system 200 includes a base station 105, and multiple UEs 115, including UE 115-a and UE 115-b, which may be examples of the corresponding devices described with reference to FIG. 1. Wireless communications system 200 may support the use of a set of AUL resource configuration for efficient AUL transmissions by a UE 115, where the set of AUL resources may include a sensing portion, a data portion, or both.

Wireless communications system 200 may operate in frequency ranges that are associated with beamformed transmissions between base station 105-a and UE 115-a and/or UE 115-b. For example, wireless communications system 200 may operate using mmW frequency ranges. As a result, signal processing techniques, such as beamforming, may be used to coherently combine energy and overcome path losses. For example, base station 105-a and the UEs 115 may communicate via beam pair links BPLs, each BPL including, for example, a transmit beam 205 of a UE 115 and a receive beam 210 of base station 105-a. It is understood that the respective devices are capable of forming directional beams for transmission and reception, where base station 105-a may also form one or more transmit beams for transmitting on the downlink, and the UEs 115 may form corresponding receive beams to receive signals from base station 105-a. In some cases, base station 105-a may only have the capacity to utilize a single receive beam 210 at a time (e.g., during a TTI), and base station 105-a may receive directional transmissions from UE 115-a and UE 115-b when monitoring the path of a transmit beam 205 (e.g., in a particular direction).

One or both of UE 115-a and UE 115-b may be capable of AUL transmissions to a base station 105-a. Thus, the UEs 115 in wireless communications system 200 may perform AUL transmissions 215 to base station 105-a via a transmit beam 205, which may be received using a corresponding receive beam 210 at base station 105-a. Corresponding beams may be defined as a receive beam 210 that is used to receive signals from a certain direction, where there may be a corresponding transmit beam 205 used to transmit in that direction. Additionally or alternatively, corresponding beams may refer to a transmit beam 205 and receive beam 210 using the same beamforming weights. There may also be correspondence between transmit beams and receive beams at the same device. For instance, base station 105-a may receive a transmission (i.e., in a first direction) on a particular receive beam 210, and base station 105-a may use the same beam path as the receive beam 210 to send downlink transmissions (i.e., in the first direction) on a corresponding transmit beam. The beamforming weights in such a scenario may be the same for both a receive beam 210 and a transmit beam at base station 105-a. The same correspondence may take place for transmit beams 205 and receive beams formed at UE 115-a and UE 115-b. In any case, an AUL transmission 215 may be sent on a set of AUL resources by UE 115-a. Base station 105-a may accordingly transmit downlink communications to the UEs 115 via downlink beams, which may include an AUL configuration, where the AUL configuration indicates the set of AUL resources for use by a UE 115.

In some examples, a set of AUL resources may be configured to include a sensing portion 225 (e.g., including an AUL indicator), a data portion 230, or any combination of the these. Resources (e.g., AUL resources) may be defined as time/frequency resources that include, for example, one or more of a resource block (RB), a beam, a subframe, and the like. For instance, an RB may be a smallest unit of time/frequency resources allocated to a user, which may comprise a number of subcarriers (e.g., 12 subcarriers) with a duration of a slot. As described in further detail below, base station 105-a may configure respective time-domain AUL resources to UE 115-a and UE 115-b, where base station 105-a may use a different receive beam 210 for receiving AUL transmission 215 from the respective UEs 115. In some examples, base station 105-a may configure different AUL resources for the different UEs 115 on different beams, where the AUL resources may overlap in time. For instance, base station 105-a may configure a first AUL resource set specific to a first base station receive beam 210, a second AUL resource set specific to a second base station receive beam 210, and so on.

While in some cases, base station 105-a may only have the capacity to receive one beam at a time, and may thus not be able to receive the AUL transmission from every UE 115 simultaneously, the AUL configuration may enable base station 105-*a* to efficiently detect and receive incoming AUL transmissions 215 on the respective sets of AUL resources. In some cases, base station 105-*a* may determine which UE 115 may transmit on an AUL resource as well as which receive beam 210 base station 105-*a* may use for receiving uplink data (e.g., base station 105-*a* may track the best receive beam 210 for UE 115-*a*). In some examples, base station 105-*a* may provide a set of AUL resources to multiple UEs 115 via an AUL configuration. The set of AUL resources may be configured such that they overlap in time, or the AUL resources may be configured such that they do not overlap in time.

Base station 105-*a* may use a combination of semi-static and dynamic indications when signaling configurations of AUL resources. For instance, base station 105-*a* may semi-statically (e.g., through RRC messaging or DCI) or dynamically (e.g., through DCI or a downlink trigger) configure the AUL resources in a beam-specific manner. In some cases, the AUL configuration may be UE-specific, cell-specific, or beam-specific. A beam-specific AUL configuration may be desirable when the UEs 115 are able to track the base station receive beam 210, which may allow UE 115-*a* to match a transmit beam 205 to the direction of a base station receive beam 210. UE 115-*a* may only send an AUL transmission 215 to base station 105-*a* on an AUL resource if UE 115-*a* determines that base station 105-*a* may be able to detect the AUL transmission 215 when base station 105-*a* uses a receive beam 210. Additionally, beam-specific AUL configurations may be desirable when the AUL traffic is random (e.g., as with web browsing).

In some examples, additional AUL resources for specific base station receive beams 210 or for specific users/user groups may be made available dynamically through DCI, a downlink trigger, or both. In some cases, if an AUL transmission 215 on a set of AUL resource includes sensing portion 225 and the data portion 230, the sensing portion 225 may be skipped (e.g., not used) for the dynamically allocated beam-specific AUL resources. In some examples, a PUSCH/DMRS pattern may be different for dynamically configured AUL resources versus semi-statically configured AUL resources. Additionally, the DCI and/or downlink trigger may indicate whether the AUL resource includes a sensing portion 225. That is, a set of AUL resources may not include the sensing portion 225, and the AUL transmission 215 may only include the data portion 230. Additionally, there may be different options configured for the different portions of the AUL resources. For instance, one or more reference signals may be transmitted within sensing portion 225, where the reference signals may be multiplexed with uplink data in sensing portion 225. In other cases, sensing portion 225 may include a sensing signal utilized by base station 105-*a* to determine a receive beam 210 for receiving the data portion 230.

The sensing signal may assist base station 105-*a* in identifying a receive beam for UE 115-*a*. UE 115-*a* may transmit the sensing signal when it has data or may transmit the sensing signal even if UE 115-*a* does not have uplink data to transmit. In some cases, UE 115-*a* may initiate a beam change, and UE 115-*a* may transmit using the sensing portion 225 when it is determined that base station 105-*a* may need to update its beam (e.g., based on downlink measurements). In other examples, base station 105-*a* may initiate a beam change. For example, a base station may monitor the SRS along a beam direction (or a plurality of beam directions). When base station 105-*a* determines that the beam strength is weak (e.g., based on an RSRP, SINR, or the like), base station 105-*a* may instruct the corresponding UE 115 (e.g., through DCI) to transmit more sensing signals so that base station 105-*a* can update the base station receive beam 210.

Sensing portion 225 may also include additional control information. For example, sensing portion 225 may include one or any combination of the following (e.g., as part of an AUL indicator): priority of the AUL transmission, a waveform used for the data transmission (e.g., PUSCH), information about the identity of the transmitting UE 115, a UE transmit beam 205 identity (e.g., for transmit beam adaptation), an MCS, a redundancy version (RV), resource allocation information (e.g., time domain and frequency domain information), reference signals (e.g., SRS or DMRS), or an indication of a preferred receive beam 210 at base station 105-*a* to be used to receive AUL transmissions (e.g., in the case base station 105-*a* uses omni-directional sensing (i.e., multiple receive beams 210 that form a pseudo-omni beam)). In some examples, the information associated with sensing portion 225 may be carried at least through a scrambling code, an orthogonal cover code, a cyclic shift, or a frequency comb associated with sensing portion 225. Sensing portion 225 may also serve as the DMRSs for the data portion 230. Base station 105-*a* may use this additional information to choose which receive beam 210 to receive uplink data, for example, in case of a confliction between multiple AUL transmissions 215.

After receiving the AUL configuration, UE 115-*a* may determine whether the beam-specific AUL resources are available to the UE 115-*a*. In some examples, base station 105-*a* may transmit an indication of whether the set of AUL resources are available for an AUL transmission. The indication may be explicit (e.g., through RRC messaging or DCI), or the indication may be implicit (e.g., an AUL indicator, a downlink trigger, or a trigger signal). For example, a downlink trigger or a trigger signal may be sent to UE 115-*a*, and UE 115-*a* may use the trigger signal to determine if a set of AUL resources are available for AUL transmission 215. In such cases, the AUL configuration may also include configuration information for the trigger signal that may be used by UE 115-*a* to both determine the time/frequency resources of the trigger signal and process the trigger signal.

Base station 105-*a* may transmit the trigger signaling using a base station transmit beam that corresponds to a base station receive beam 210 of an AUL resource. Due to reciprocity, if UE 115-*a* detects the downlink trigger sent on the transmit beam corresponding to the base station receive beam 210 using a UE receive beam, an AUL transmission using a transmit beam 205 that follows the same path as the base station receive beam 210 may be detectable by the base station 105 using base station receive beam 210, and thus UE 115-*a* may send its AUL traffic on the transmit beam 205. The base station transmit beam and base station receive beam 210 may refer to beams used by base station 105-*a* to transmit and receive in the same direction. For example, the base station beam and base station receive beam 210 may use the same beamforming weights. Similarly, transmit beam 205 and the UE receive beam may refer to the UE transmit beams 205 and the UE receive beam that may be in the same direction at the UE 115. In some examples, UE 115-*a* may be preconfigured with where to monitor (e.g., resources on which to monitor) for the trigger signal. Additionally or alternatively, multiple AUL resources may share the same trigger. In some examples, UE 115-*a* may determine that the AUL resources are available for AUL transmissions based at least in part on one or more of the following: determining that the signal strength of the trigger signal being above a threshold, detecting the presence or absence of the trigger signal, or successfully decoding the trigger signal.

In some examples, the downlink trigger may be a waveform-based design. The trigger signal may be FDM with a synchronization signal burst (SSB) transmission, or the trigger signal may be the SSB itself. In such a case, the AUL configuration information also configures which SSB to monitor for the trigger signal. In some examples, the downlink trigger may comprise RRC messaging, DCI, downlink messaging, a PDCCH, a reference signal, an SSB, or a combination thereof.

In cases where the trigger includes a PDCCH transmission, the PDCCH may indicate a subset of AUL resources within the set of available AUL resources. The PDCCH may also indicate a second trigger signal associated with AUL resources, where the second trigger signal may be used to determine whether the AUL resources are available. The second trigger signal may be a reference signal or signaling within SSBs using the same beam. In some cases, the trigger may indicate information related to an AUL transmission 215. For instance, the downlink trigger may indicate, either implicitly or explicitly, one or a combination of the following: an identifier of a detected sensing resource (e.g., sensing portion 225), information about the transmitting UE's identity, beam identity information (e.g., base station receive beam ID, base station transmit beam ID, UE transmit beam ID for transmitting PUSCH, etc.), base station transmission identity, UE data portion transmission identity, AUL data resource allocation corresponding to one or more beams, and waveform type to use for the AUL resource data portion (e.g., for PUSCH).

If the beam-specific AUL resources are determined to be available to UE 115-a, UE 115-a may use the transmit beam 205 that is most suitable for uplink transmission (e.g., using a transmit beam 205 that aligns with a configured base station receive beam 210 or using a transmit beam 205 that experiences the least interference or has the highest receive signal strength), and, thus, transmit on the corresponding AUL resource that is configured to the base station receive beam 210.

In some examples, base station 105-a may transmit an indication of the set of AUL resources to UE 115-a via the AUL configuration, and UE 115-a may not be aware of the base station receive beam 210 associated with the AUL resources. In such cases, base station 105-a may monitor transmit beams 210 from UE 115-a to determine the best BPL on which to communicate with UE 115-a, where the BPL includes a receive beam 210 and a transmit beam 205 that follow the same path. The best BPL may be the BPL that features the highest reference signal received quality (RSRQ) or the highest signal-to-interference-plus-noise ratio (SINR) compared to the other BPLs. Base station 105-a may configure different UEs 115 such that their AUL resources do not overlap in time, or base station 105-a may configure different UEs 115 such that their AUL resources overlap in time. In the case of an overlap, base station 105-a may determine which receive beam 210 to receive on.

Base station 105-a and its corresponding UE(s) 115 (e.g., UE 115-a and UE 115-b) may have a known procedure for searching for and refining receive beams 210 to use for AUL reception. In some cases, base station 105-a and UE 115-a may implement additional procedures to identify and refine the receive beams 210 used for AUL reception. For example, UE 115-a may transmit uplink data (e.g., PUSCH) on its AUL resource on different transmit beams 205. Base station 105-a may cycle through different receive beams 210 until a transmit beam 205 is detected and the AUL transmission 215 may be subsequently received. To avoid missing data transmissions, this process may require repetitions of the uplink data within the AUL transmission 215. In some examples, base station 105-a may know a base station receive beam 210 on which communication with UE 115-a is successful. In such cases, base station 105-a may only monitor this receive beam 210 until it detects the AUL transmission 215.

In some examples, UE 115-a may transmit an AUL indicator or a sensing signal to base station 105-a. Base station 105-a may determine to use a receive beam 210 based at least in part on the AUL indicator sent by UE 115-a. In some examples, the AUL indicator is included in the sensing portion 225 of the AUL resource. UE 115-a may determine when to transmit the AUL indicator, where the AUL indicator may be sent when UE 115-a has data to transmit or when UE 115-a does not have data to transmit. UE 115-a may also determine to update a transmit beam 205 based on downlink signal measurements, and UE 115-a may transmit the AUL indicator based at least in part on this determination. In some examples, base station 105-a may configure UE 115-a to perform the functions described herein.

Accordingly, through various AUL resource configuration schemes, various processes may be used to enable efficient AUL transmissions using directional beams. For instance, a single-step process may include UE 115-a identifying a set of AUL resources corresponding to a desired receive beam 210 or resource that is assigned to UE 115-a, and UE 115-a may then perform an AUL transmission on that set of AUL resources. In a two-step process, base station 105-a may send a trigger to notify UE 115-a that AUL resources are available. UE 115-a may thus use the set of AUL resources if it detects the trigger and/or if the trigger matches a receive beam 210. Additionally or alternatively, in another two-step process, UE 115-a may transmit a sensing signal to base station 105-a. In such cases, UE 115-a may identify one or more AUL sensing resources (e.g., a sensing portion 225), which may correspond to a desired receive beam 210 at base station 105-a (e.g., if UE 115-a is aware of the receive beam 210 for that resource). UE 115-a may then transmit the sensing signal (or AUL indicator) on the one or more AUL sensing resources as well as a PUSCH transmission. In this case, sensing by base station 105-a may be along a particular receive beam 210, or may be along multiple receive beams 210 or omni-directional. Thus, sensing resources for different receive beams 210 may be overlapping. Subsequently, base station 105-a may adapt its receive beam 210 for the set of AUL resources (and the PUSCH transmission) based on the sensing operation.

In other examples, a three-step process may be used for AUL transmissions using directional beams. For instance, UE 115-a may transmit a sensing signal without sending uplink data. Base station 105-a may detect the sensing signal and then send the trigger signal (or DCI) that may enable UE 115-a to identify whether UE 115-a may proceed with an AUL transmission of uplink data (e.g., on PUSCH). If it is determined that AUL resources are available for such transmissions, then UE 115-a may proceed with transmitting the uplink data.

Figure 3A:
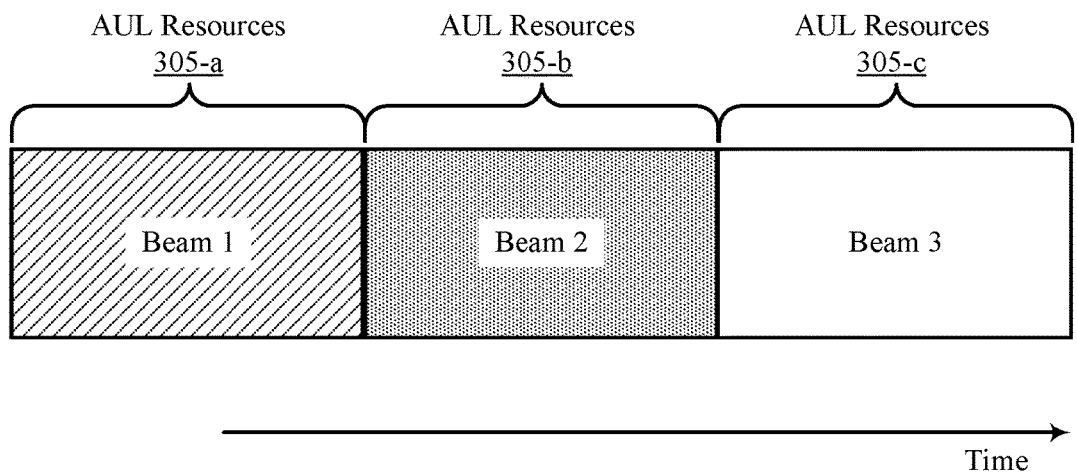
FIGS. 3A and 3B illustrate examples of AUL resource configurations in a system that supports AUL with analog beams in accordance with aspects of the present disclosure.
Figure 3B:
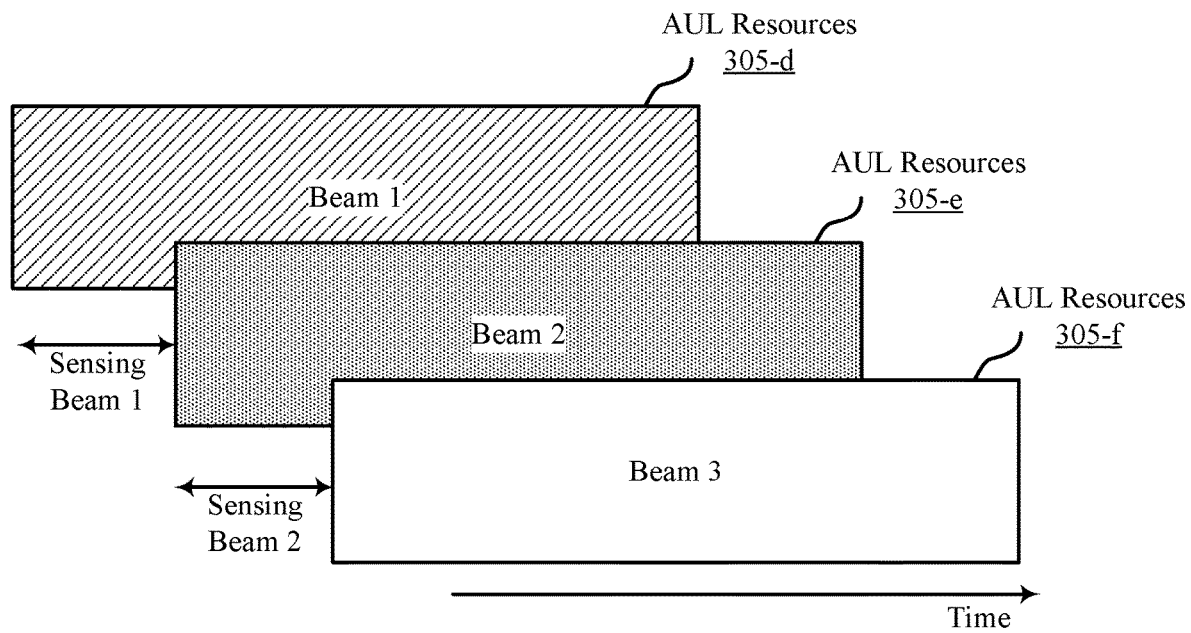

FIGS. 3A and 3B illustrate examples of AUL resource configurations 301 and 302 in a system that supports AUL with analog beams in accordance with various aspects of the present disclosure. Aspects of AUL resource configurations 301 and 302 may be implemented by a UE 115 and a base station 105, which may be examples of corresponding devices with respect to wireless communications systems 100 and 200. AUL resource configurations 301 and 302 may illustrate an example of AUL resources that are configured for specific receive beams at a base station 105.

For example, AUL resource configuration 301 may include multiple sets of AUL resources 305, where the respective sets of AUL resources 305 may be configured such that they do not overlap in time. As described herein, a base station 105 may configure AUL resources to be beam specific. As a result, each set of AUL resources 305 may be specific to a receive beam at the base station 105. For instance, a first set of beam-specific AUL resources 305-*a* may be specific to a first AUL receive beam (e.g., beam 1), a second set of beam-specific AUL resources 305-*b* may be specific to a second AUL receive beam (e.g., beam 2), and so forth. In such cases, the AUL resources may be multiplexed such that one AUL resource begins after the prior AUL resource ends. That is, the sets of AUL resources 305-*a*, 305-*b*, 305-*c* may be non-overlapping.

In using AUL resource configuration 301, a UE 115 may determine that a first set of beam-specific AUL resources 305 is available (e.g., a UE 115 may determine that its transmissions may be detected by a base station 105 when the base station 105 uses a receive beam (e.g., beam 1)), and may select the first set of beam-specific AUL resources 305 that corresponds to a receive beam at the base station 105 for a corresponding transmit beam the UE 115 is using (e.g., a beam found through a beam refinement procedure with the base station 105). Likewise, another UE 115 may select a second set of beam-specific AUL resources 305-*b* for an AUL transmission. The base station 105 may accordingly receive AUL transmissions from each UE 115 on the respective sets of beam-specific AUL resources 305 using a different receive beam associated with a different AUL resource 305. As described herein, each AUL resource 305 may include a sensing portion, or a data portion, or both.

AUL resource configuration 302 may illustrate AUL resources 305 with both non-overlapping and overlapping portions. For example, the AUL resources may be multiplexed such that, while a data portion of the AUL resources 305-*d*, 305-*e*, and 305-*f* overlap with each other, the respective sensing portions of different AUL resources 305 may not overlap. In such a case, a base station 105 may monitor for the sensing portions of the respective AUL resources 305, and when the base station 105 detects a sensing portion (e.g., detects a sensing signal or an AUL indicator) of an AUL resource 305, the base station 105 may monitor the rest of the AUL resource 305 for the data portion.

As an example, there may be no UE 115 performing an AUL transmission using a first set of beam-specific AUL resources 305-*d* corresponding to a first receive beam. However, a first UE 115 may perform an AUL transmission using a second set of beam-specific AUL resources 305-*e* for a second receive beam, and a second UE 115 may perform an AUL transmission using a third set of beam-specific AUL resources 305-*f* for a third receive beam. In such cases, the sensing portions of the second set of beam-specific AUL resources 305-*e* and the third set of beam-specific AUL resources 305-*f* may not overlap in time, which may enable the base station 105 to efficiently detect a sensing portion of beam-specific AUL resources 305.

A base station 105 may attempt to detect the first transmit beam, but since the first set of beam-specific AUL resources 305-*d* may not carry an AUL transmission, the base station 105 may not detect any sensing signals on the first transmit beam. The base station 105 may then attempt to detect the second transmit beam, and upon detecting the sensing portion of the second set of beam-specific AUL resource 305-*e*, the base station 105 may continue to monitor the second transmit beam for a subsequent data portion of the second set of beam-specific AUL resources 305-*e*. Because a sensing portion of the third set of beam-specific AUL resource 305-*f* may overlap in time with the data portion of AUL resources 305, the base station 105 may not detect the AUL transmission on the third set of beam-specific AUL resources 305-*f* until after finishing monitoring the second receive beam.

In the example of AUL resource configuration 302, a base station 105 may receive data from only one UE 115 at any given time. An advantage of techniques utilizing AUL resource configuration 302 having overlapping AUL resources may be that a number of resources reserved for AUL transmissions are lower (e.g., as compared to cases where resources do not overlap). In the examples when most UEs 115 are not transmitting AUL data on the AUL resources, and chances of collision of AUL transmissions of two UEs 115 configured with overlapping resources are low, this approach may allow data to be transmitted successfully in most cases with reduced overhead.

In some cases, a DMRS for a PUSCH transmission may be used for the sensing signal in the sensing portion of each set of beam-specific AUL resources 305. The sensing portion may provide for a processing delay of sensing and switching time (e.g., for a beam change). In some cases, the order of the receive beams (e.g., the order in which the AUL resources for respective beams are available in time) may change, and may be modified over time, for example, to enable fairness across different receive beams (which may correspond to different UEs 115, and accordingly ensure fairness for those users). In some examples, the resources mentioned as beam-specific AUL resources may also be configured as sets of AUL resources per UE 115 (e.g., UE-specific), while a particular UE 115 may not be aware of the associated receive beam.

Figure 4A:
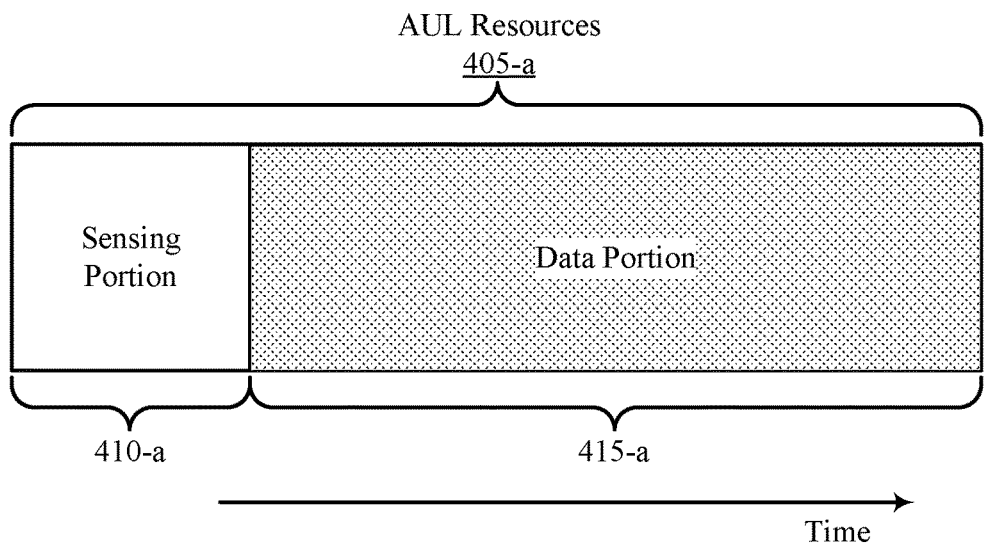
FIGS. 4A and 4B illustrate examples of AUL resource configurations in a system that supports AUL with analog beams in accordance with aspects of the present disclosure.
Figure 4B:
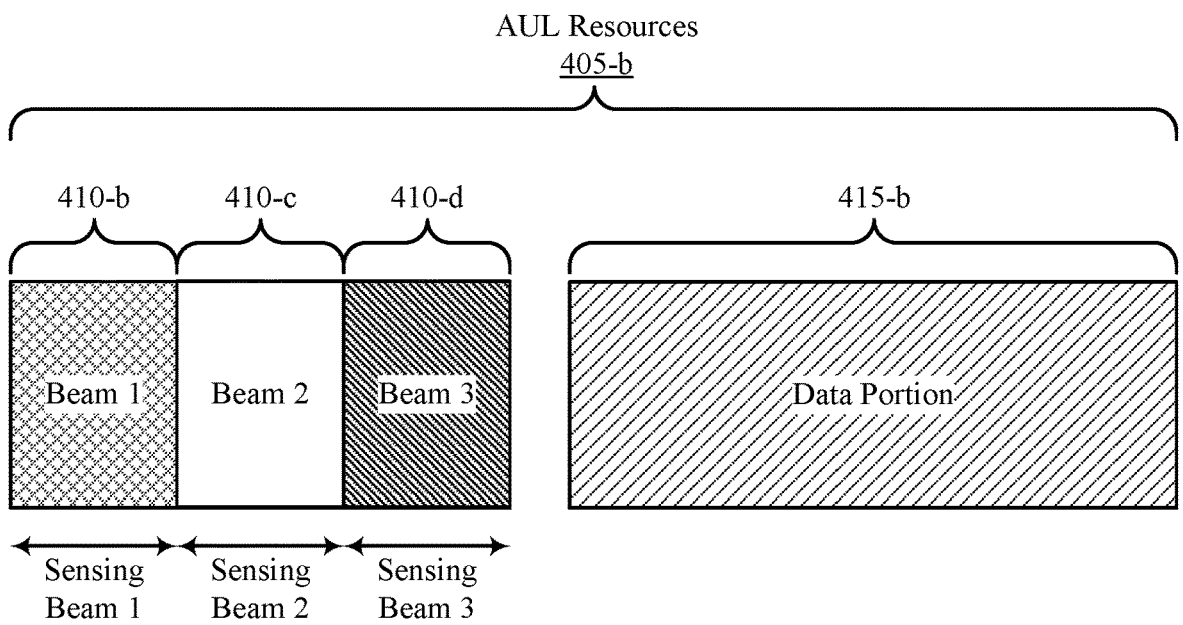

FIGS. 4A and 4B illustrate examples of AUL resource configurations 401 and 402 that supports AUL with analog beams in accordance with various aspects of the present disclosure. Aspects of AUL resource configurations 401 and 402 may be implemented by a UE 115 and a base station 105, which may be examples of corresponding devices with respect to wireless communications systems 100 and 200. AUL resource configurations 401 and 402 may illustrate an example of AUL resources that are configured for users or user groups. User-specific AUL resource configurations 401 and 402 may be desirable when UEs 115 are likely to transmit uplink data frequently on their assigned resources (e.g., semi-persistent scheduling (SPS) applications such as voice/video call).

For example, in AUL resource configuration 401, sets of AUL resources 405-*a* may have overlapping sensing portions 410-*a*, where a data portion 415-*a* may be non-overlapping and time division multiplexed. In such cases, a base station 105 may support a multi-beam sensing capability (e.g., omni-directional sensing) that allows the base station 105 to receive multiple transmit beams from different directions when a sensing portion 410 is transmitted. In such cases, UEs 115 may simultaneously transmit their respective AUL transmissions including sensing signals to the base station 105.

Based on the presence and/or a received signal strength of the received sensing signals, the base station 105 may determine the beam direction of each UE 115 that may be performing an AUL transmission. Accordingly, the base station 105 may tune its receive beam prior to or during data portion 415-*a* to align with the determined transmit beam paths corresponding to a UE 115, which may allow the base station 105 to receive the respective data portion 415-a from the UE 115. A UE 115 may multiplex its respective data portions 415 along the same transmit beam path as their respective sensing signals, where the base station 105 may be capable of receiving the data portions after tuning or re-tuning its receive beams to align with the respective transmit beams of the UEs 115. In some examples, the UEs 115 may transmit DMRS for both the sensing portion 410-a and the data portion 415-a due to a base station receive beam change at the base station 105.

Additionally or alternatively, and as illustrated in AUL resource configuration 402, respective sensing portions 410 for different base station receive beams may be time division multiplexed and non-overlapping for different beams, and the data portion 415 may also be non-overlapping and time division multiplexed. A UE 115 may transmit an AUL indication or a sensing signal to a base station 105 in one or more of the sensing portions 410, where the multiple sensing portions 410 are multiplexed such that they do not overlap in time. For example, sensing portions 410-b, 410-c, and 410-d may each correspond to a different receive beam, and may be multiplexed such that they do not overlap in time. As a result, a UE 115, with uplink data to transmit, may transmit in one (or more) of the sensing portions 410 and then in the data portion 415. In some cases, if the UE 115 is aware of a mapping between a sensing portion 410 and a receive bean at the base station 105, the UE 115 may transmit the sensing signal only on the associated beam. Upon sensing an AUL indicator or sensing signal in one or more of the sensing portions 410, the base station 105 may tune its receive beam to receive a data portion 415-b of an AUL transmission. In some cases, a combination of the various options described herein may be used for different groups of beams. For example, different options may be utilized based on a type of data sent in the AUL transmission (e.g., SPS applications such as voice/video calls versus random transmissions, such as web browsing).

In some cases, a base station 105 may also indicate (e.g., through DCI or a downlink trigger) which UE 115 (e.g., of a set of UEs 115) may transmit using a set of AUL resources 405. The downlink trigger may be transmitted along a beam path that corresponds to the tuned receive beam. Additionally or alternatively, the downlink trigger may be sent along a beam path that may be defined using the same beamforming weights as the tuned receive beams. In such cases, the UE 115 may monitor the trigger to see if a transmitted sensing signal (or AUL indicator) sent in a sensing portion 410 was accepted. If a trigger signal is received, then the UE 115 may proceed with performing an AUL transmission.

Figure 5:
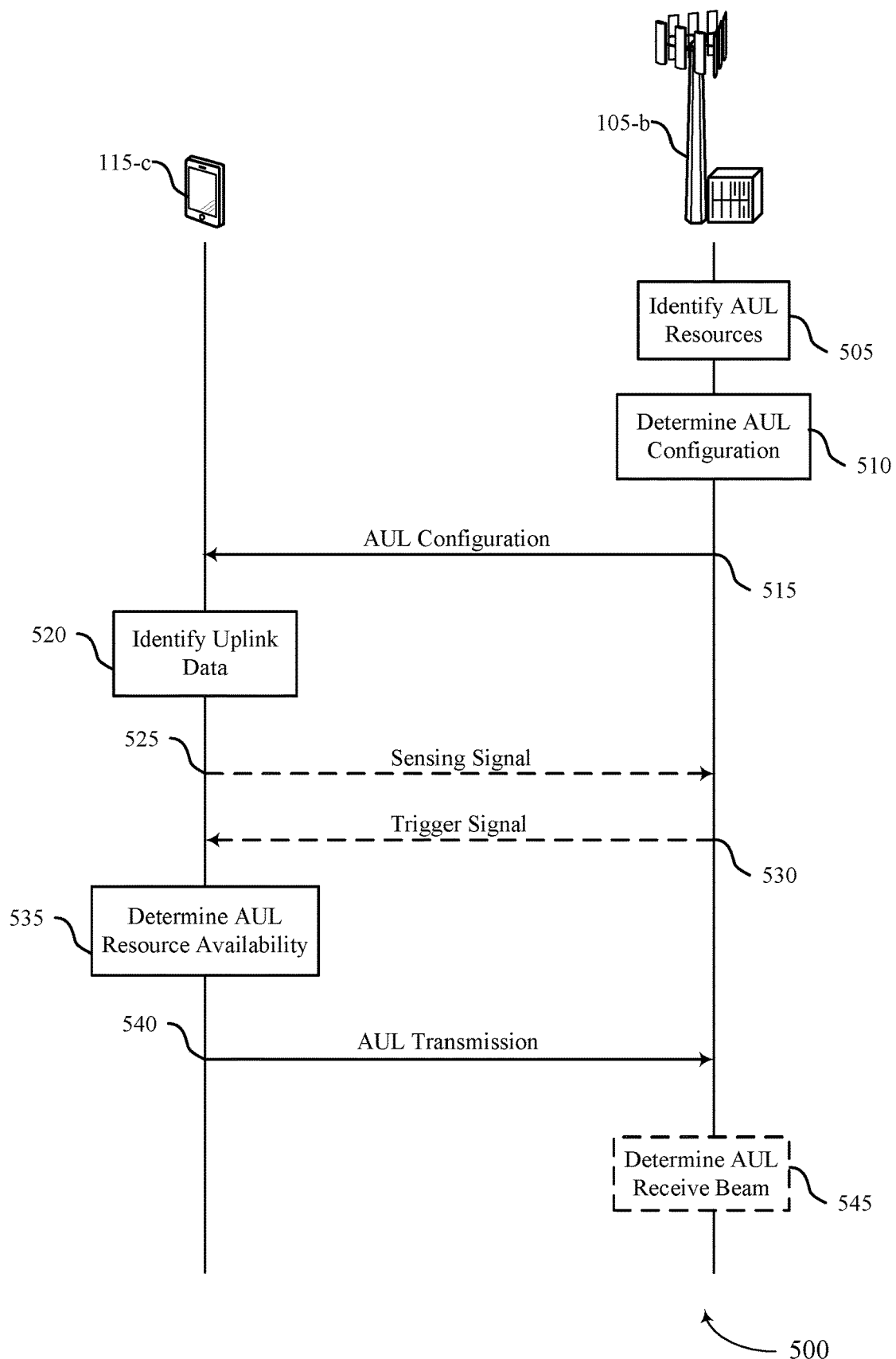
FIG. 5 illustrates an example of a process flow in a system that supports AUL with analog beams in accordance with aspects of the present disclosure.

FIG. 5 illustrates an example of a process flow 500 in a system that supports AUL with analog beams in accordance with various aspects of the present disclosure. In some examples, process flow 500 may implement aspects of wireless communications system 100. For example, process flow includes base station 105-b and UE 115-c, which may be examples of the corresponding devices described with reference to FIGS. 1 and 2. Process flow 500 may illustrate an example of different AUL resource configurations to enable efficient AUL transmissions with analog beams (e.g., in a mmW communications system).

At 505, base station 105-b may identify a set of AUL resources for one or more UEs 115 (e.g., including UE 115-c). The AUL resources may be identified for use in AUL transmissions by the UEs 115. At 510, base station 105-b may determine an AUL configuration for a set of AUL resources and one or more AUL receive beams of base station 105-b. In some examples, the set of AUL resources may be specific to an AUL receive beam of base station 105-b. In other examples, the AUL resources may not be specific to a particular beam, but may be specific to UE 115-c, or to a group of users. Base station 105-b may configure the set of AUL resources such that the AUL resources may be multiplexed (e.g., time division multiplexed) with a second set of AUL resources, where the second set of AUL resources may be specific to a second AUL receive beam of base station 105-b.

In some cases, base station 105-b may configure the set of beam-specific AUL resources to include a first portion and a second portion. The first portion may be non-overlapping with a portion of a second set of AUL resources and the second portion may at least partially overlap with the second set of AUL resources, where the second set of AUL resources may be specific to a second AUL receive beam of base station 105-b. Additionally or alternatively, base station 105-b may configure a set of beam-specific AUL resources to be TDM with the second set of AUL resources. In some cases, the first portion may be used by UE 115-c for a sensing signal and the second portion may be used for uplink data.

At 515, base station 105-b may transmit, to UE 115-c, the AUL configuration including an indication of the set of AUL resources. Transmitting the AUL configuration transmission may include transmitting one or more of: an RRC message including the AUL configuration, DCI including the AUL configuration, or a trigger signal including the AUL configuration. The AUL configuration information may include a trigger signal configuration, where the trigger signal configuration may comprise an indication of time/frequency resources associated with a trigger signal and information for processing the trigger signal.

At 520, UE 115-c may identify uplink data for an AUL transmission to base station 105-b. At 525, base station 105-b may transmit a trigger signal, which may include an indication that the set of AUL resources may be available for AUL transmissions. At 525, UE 115-c may optionally transmit a sensing signal. For example, UE 115-c may transmit a sensing signal without uplink data. Base station 105-b may detect the sensing signal and, in response, transmit a trigger signal including an indication that the set of AUL resources is available for AUL transmissions by UE 115-c at 530.

In other cases, base station 105-b may transmit the trigger signal at 530 to indicate to UE 115-c whether the AUL resources are available. The trigger signal may be transmitted using a transmit beam that may correspond to an AUL receive beam for receiving a second portion (a data portion) of an AUL transmission. In some cases, the trigger signal may include a sensing resource identifier, UE identity information, a beam identity, uplink resource allocation corresponding to a set of beams, a waveform to use for a PUSCH, or a combination thereof. The transmission information may be carried at least partially through a scrambling code associated with the AUL indicator, an orthogonal cover code associated with the AUL indicator, a cyclic shift associated with the AUL indicator, a frequency comb associated with the AUL indicator, or a combination thereof. In some examples, the trigger signal comprises RRC messaging, DCI, downlink messaging, a PDCCH, a reference signal, a synchronization signal burst, or a combination thereof.

In some examples, the PDCCH may indicate a subset of AUL resources that may be available within the set of beam-specific AUL resources. The PDCCH may indicate a second trigger signal associated with the set of beam-specific AUL resources. The second trigger signal may be used to determine whether the set of beam-specific AUL resources may be available for the AUL transmission by UE 115-*c*. Additionally or alternatively, the second trigger may comprise a comprises a second reference signal, or signaling within a synchronization signal burst, or a combination thereof.

At 535, UE 115-*c* may determine whether the set of beam-specific AUL resources may be available for an AUL transmission. UE 115-*c* may determine that the set of beam-specific AUL resources may be available for the AUL transmission by UE 115-*c* based at least in part on one or more of: receiving the trigger signal (e.g., at 530), determining that a signal strength of the trigger signal may satisfy a threshold, a presence or absence of the trigger signal, or decoding the trigger signal.

At 540, UE 115-*c* may perform an AUL transmission of the uplink data to base station 105-*b* using the set of beam-specific AUL resources based at least in part on a determination that the set of beam-specific AUL resources may be available for the AUL transmission (e.g., in the case of a beam-specific AUL resource configuration). Additionally, or alternatively, UE 115-*c* may perform the AUL transmission using the set of AUL resources, where a first portion of the AUL transmission includes a sensing signal and a second portion of the AUL transmission comprises the uplink data (e.g., in the case of a user-specific AUL resource configuration).

In some examples, UE 115-*c* may perform the AUL transmission with one or more repetitions of the data portion on the AUL resources. Additionally or alternatively, UE 115-*c* may perform the AUL transmission with one or more reference signals, where the sensing signal may comprise the one or more reference signals. The one or more reference signals may comprise an SRS, or a DMRS, or a combination thereof. In some cases, UE 115-*c* may time division multiplex the first portion of the AUL transmission with the second portion of the AUL transmission. Additionally or alternatively, the uplink data may include one or more additional reference signals.

In some examples, base station 105-*b* may receive from UE 115-*c* an AUL indicator within the first portion of the AUL transmission, where the AUL indicator may be multiplexed with the uplink data in the first portion of the set of beam-specific AUL resources. The AUL indicator may comprise an indication of a priority of the uplink data, a waveform for a PUSCH, an MCS, an RV, a time/frequency resource allocation for a subsequent uplink data transmission, UE identity information, transmit beam information, an indication of a preferred receive beam to be used to receive AUL transmissions, or a combination thereof. In some examples, the AUL indicator may serve as a DMRS for the uplink data. The AUL receive beam may comprise a mmW communications beam. The transmission information may be carried at least partially through a scrambling code associated with the AUL indicator, an orthogonal cover code associated with the AUL indicator, a cyclic shift associated with the AUL indicator, a frequency comb associated with the AUL indicator, or a combination thereof.

Base station 105-*b* may accordingly monitor for one or more sensing signals corresponding to a set of AUL beams. For example, base station 105-*b* may monitor in a plurality of beam directions during the first portion of the AUL transmission. Additionally or alternatively, base station 105-*b* may monitor different beam directions in respective time division multiplexed portions of the AUL transmission.

In some cases, at 535, base station 105-*b* may determine an AUL receive beam for receiving the second portion of the AUL transmission. The AUL receive beam may correspond to the set of AUL resources, where the AUL receive beam may be determined based at least in part on the sensing signal received within the AUL transmission.

Figure 6:
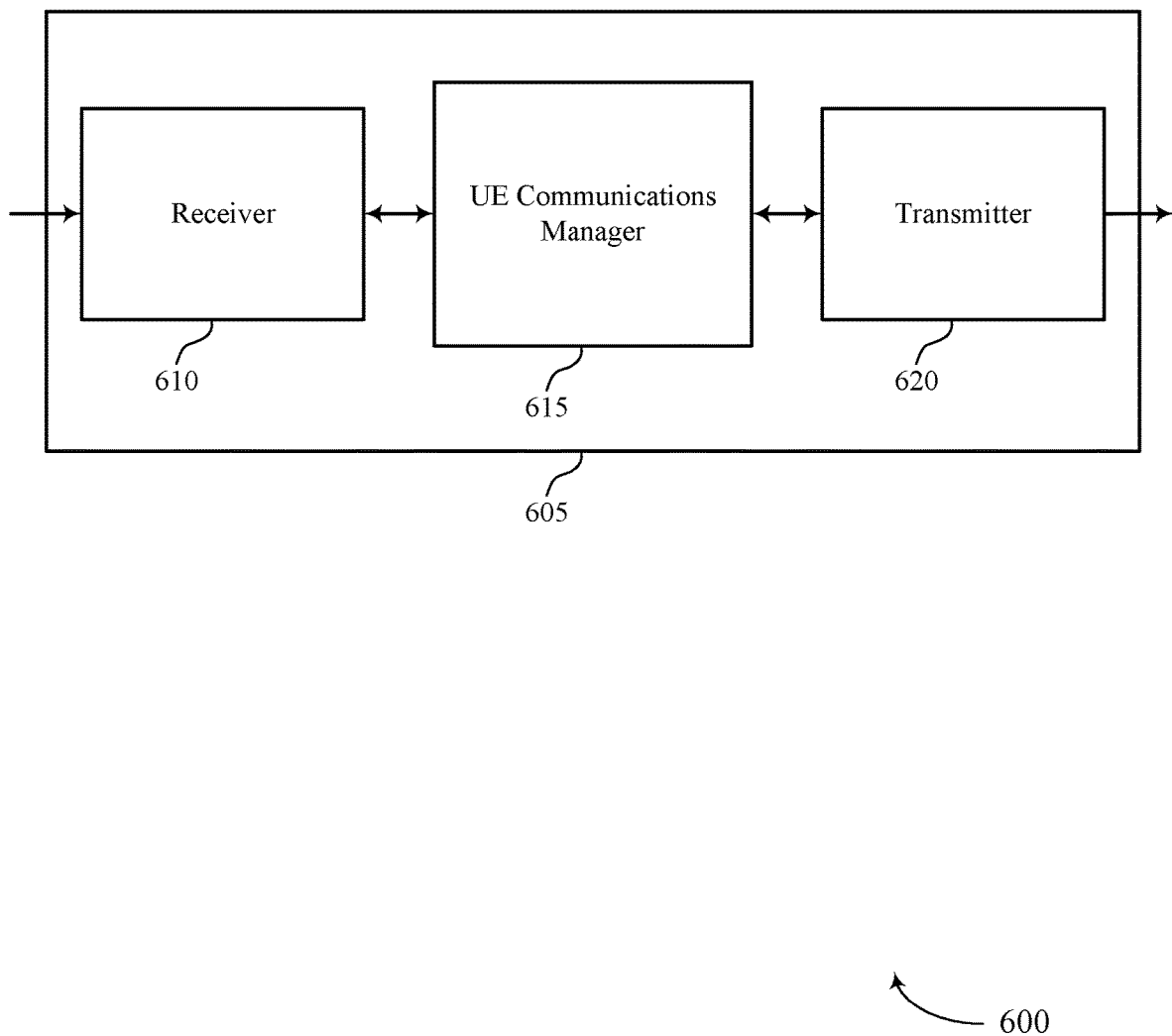
FIGS. 6 through 8 show block diagrams of a device that supports AUL with analog beams in accordance with aspects of the present disclosure.

FIG. 6 shows a block diagram 600 of a wireless device 605 that supports AUL with analog beams in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to AUL with analog beams, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive, from a base station 105, an AUL configuration including an indication of a set of AUL resources for a UE 115, where the set of AUL resources is specific to an AUL receive beam of the base station 105, identify uplink data for an AUL transmission to the base station 105, and determine whether the set of beam-specific AUL resources is available for the AUL transmission by the UE 115. UE communications manager 615 may perform an AUL transmission of the uplink data to the base station 105 using the set of beam-specific AUL resources based on a determination that the set of beam-specific AUL resources is available for the AUL transmission.

In some cases, the UE communications manager 615 may also receive, from a base station 105, an AUL configuration including an indication of a set of AUL resources for a UE 115, identify uplink data for an AUL transmission to the base station 105, and perform the AUL transmission using the set of AUL resources, where a first portion of the AUL transmission includes a sensing signal and a second portion of the AUL transmission includes the uplink data.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
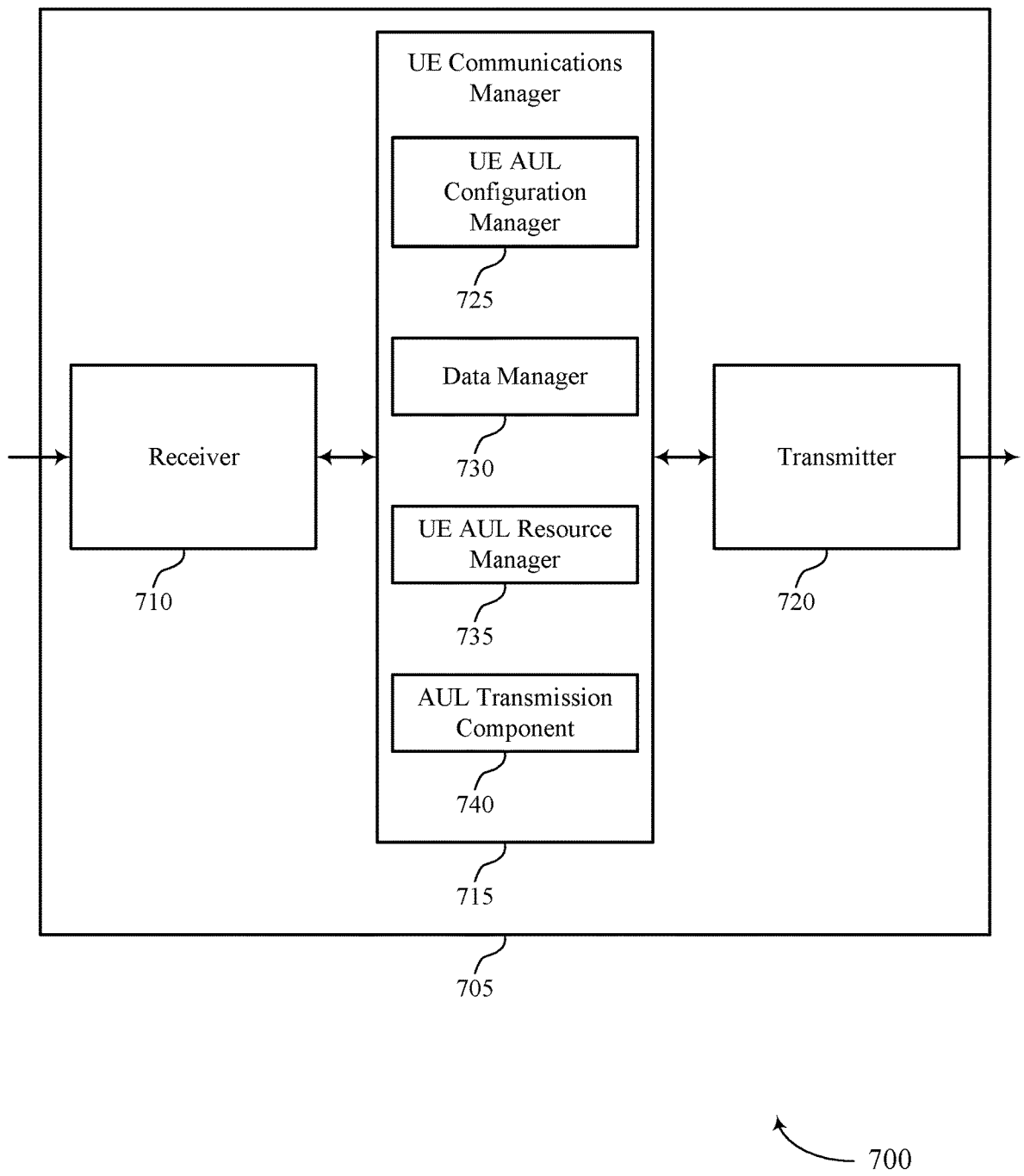

FIG. 7 shows a block diagram 700 of a wireless device 705 that supports AUL with analog beams in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to AUL with analog beams, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include UE AUL configuration manager 725, data manager 730, UE AUL resource manager 735, and AUL transmission component 740.

UE AUL configuration manager 725 may receive, from a base station 105, an AUL configuration including an indication of a set of AUL resources for a UE 115, where the set of AUL resources is specific to an AUL receive beam of the base station 105. In other cases, the AUL configuration may include an indication of a set of AUL resources specific to the UE 115. In some cases, receiving the AUL configuration includes receiving one or more of: an RRC message including the AUL configuration, DCI including the AUL configuration, or a trigger signal including the AUL configuration. In some cases, the AUL configuration includes a trigger signal configuration, where the trigger signal configuration used to determine time/frequency resources associated with a trigger signal and may be used to process the trigger signal. In some cases, the AUL receive beam includes a mmW communications beam.

Data manager 730 may identify uplink data for an AUL transmission to the base station 105. UE AUL resource manager 735 may determine whether the set of beam-specific AUL resources is available for the AUL transmission by the UE 115. For example, UE AUL resource manager 735 may determine that the set of beam-specific AUL resources is available for the AUL transmission by the UE 115 based on the trigger signal, where an AUL transmission is performed based on the received trigger signal. Additionally or alternatively, UE AUL resource manager 735 may determine that the set of beam-specific AUL resources is available for the AUL transmission based on decoding the trigger signal.

In some cases, determining that the set of beam-specific AUL resources is available for the AUL transmission includes determining that the set of beam-specific AUL resources is available based on a signal strength of the trigger signal satisfying a threshold. In some cases, determining whether the set of beam-specific AUL resources is available for the AUL transmission includes determining that the set of beam-specific AUL resources is available for the AUL transmission based on a presence of the trigger signal or an absence of the trigger signal. In some cases, the set of beam-specific AUL resources is TDM with a second set of AUL resources, where the second set of AUL resources is specific to a second AUL receive beam of the base station 105.

AUL transmission component 740 may perform an AUL transmission of the uplink data to the base station 105 using the set of beam-specific AUL resources based on a determination that the set of beam-specific AUL resources is available for the AUL transmission. In some examples, AUL transmission component 740 may perform the AUL transmission using the set of AUL resources, where a first portion of the AUL transmission includes a sensing signal and a second portion of the AUL transmission includes the uplink data. In some cases, AUL transmission component 740 may perform the AUL transmission based on the received trigger signal.

In some cases, a first portion of the AUL transmission includes a first portion and a second portion, where the first portion may be non-overlapping with a portion of a second set of AUL resources and the second portion may be at least partially overlapping with the second set of AUL resources. In some cases, the second set of AUL resources may be specific to a second AUL receive beam of the base station 105. In some cases, performing the AUL transmission includes transmitting the uplink data within the first portion and the second portion of the AUL transmission, and transmitting an AUL indicator within the first portion, where the AUL indicator is multiplexed with the uplink data. In some cases, performing the AUL transmission includes performing the AUL transmission with one or more repetitions of the uplink data on the set of AUL resources. In some examples, performing the AUL transmission includes performing the AUL transmission with one or more reference signals within the first portion of the AUL transmission, where the sensing signal may include the one or more reference signals. In some cases, the one or more reference signals include an SRS, or a DMRS, or a combination thereof.

In some examples, the first portion of the AUL transmission may be TDM with the second portion, and where the uplink data includes one or more additional reference signals. The sensing signal may include an AUL indicator that includes transmission information including an indication of a priority of the uplink data, a waveform for a PUSCH, an MCS, an RV, a time/frequency resource allocation for a subsequent data transmission, UE identity information, transmit beam information, an indication of a receive beam to be used to receive the AUL transmission, or a combination thereof. In some cases, the transmission information is at least partially carried through a scrambling code associated with the AUL indicator, an orthogonal cover code associated with the AUL indicator, a cyclic shift associated with the AUL indicator, a frequency comb associated with the AUL indicator, or a combination thereof.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
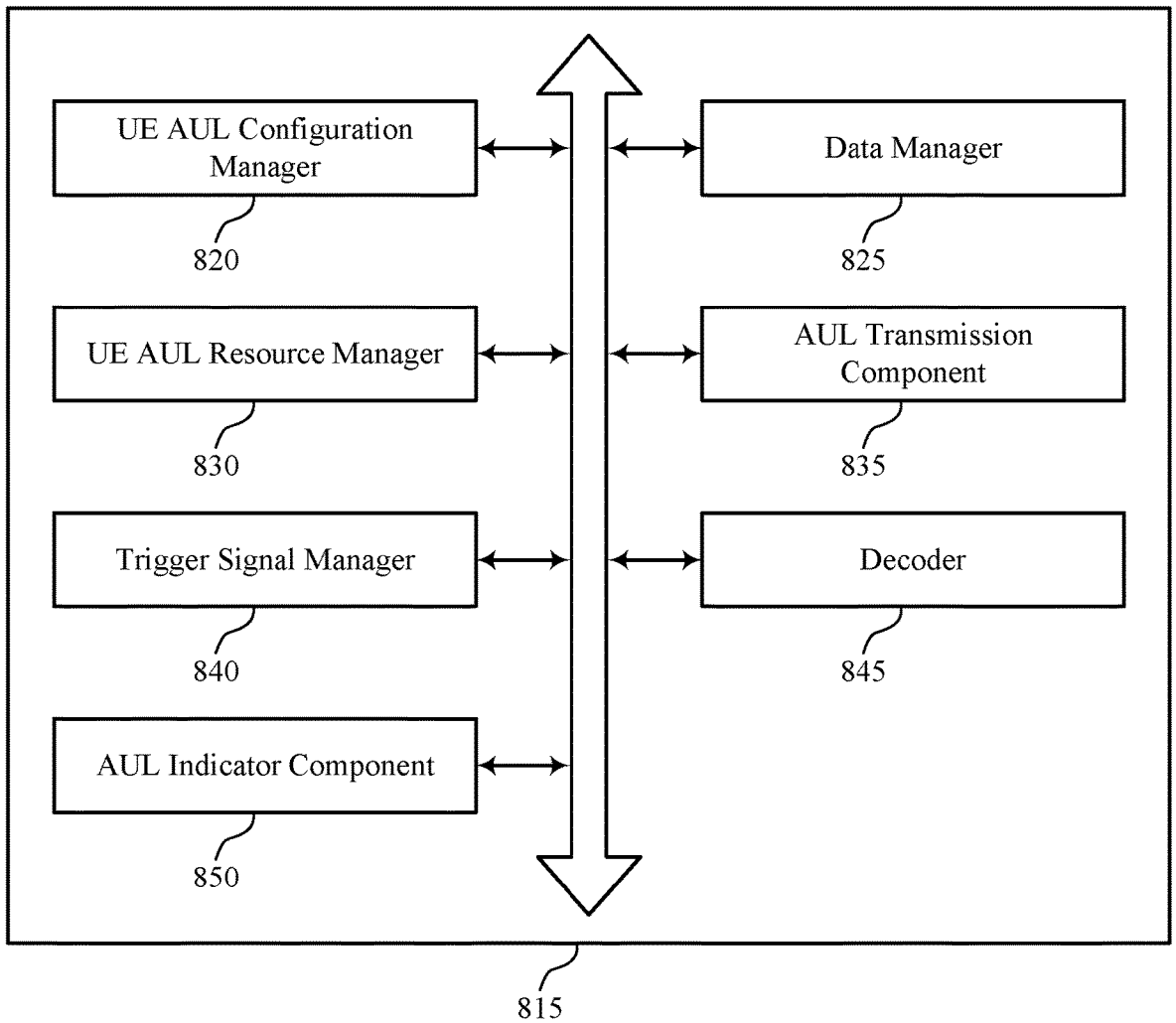

FIG. 8 shows a block diagram 800 of a UE communications manager 815 that supports AUL with analog beams in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include UE AUL configuration manager 820, data manager 825, UE AUL resource manager 830, AUL transmission component 835, trigger signal manager 840, decoder 845, and AUL indicator component 850. Each of these modules may communicate, directly or indirectly, with one another (e.g., via one or more buses).

UE AUL configuration manager 820 may receive, from a base station 105, an AUL configuration including an indication of a set of AUL resources for a UE 115, where the set of AUL resources is specific to an AUL receive beam of the base station 105. In other examples, the AUL configuration may include an indication of a set of AUL resources specific to the UE 115. In some cases, receiving the AUL configuration includes receiving one or more of: an RRC message including the AUL configuration, DCI including the AUL configuration, or a trigger signal including the AUL configuration. In some cases, the AUL configuration includes a trigger signal configuration, where the trigger signal configuration used to determine time/frequency resources associated with a trigger signal and may be used to process the trigger signal. In some cases, the AUL receive beam includes a mmW communications beam.

Data manager 825 may identify uplink data for an AUL transmission to the base station 105. UE AUL resource manager 830 may determine whether the set of beam-specific AUL resources is available for the AUL transmission by the UE 115. For example, UE AUL resource manager 830 may determine that the set of beam-specific AUL resources is available for the AUL transmission by the UE 115 based on the trigger signal, where an AUL transmission is performed based on the received trigger signal. Additionally or alternatively, UE AUL resource manager 830 may determine that the set of beam-specific AUL resources is available for the AUL transmission based on decoding the trigger signal.

In some cases, determining that the set of beam-specific AUL resources is available for the AUL transmission includes determining that the set of beam-specific AUL resources is available based on a signal strength of the trigger signal satisfying a threshold. In some cases, determining whether the set of beam-specific AUL resources is available for the AUL transmission includes determining that the set of beam-specific AUL resources is available for the AUL transmission based on a presence of the trigger signal or an absence of the trigger signal. In some cases, the set of beam-specific AUL resources is TDM with a second set of AUL resources, where the second set of AUL resources is specific to a second AUL receive beam of the base station 105.

AUL transmission component 835 may perform an AUL transmission of the uplink data to the base station 105 using the set of beam-specific AUL resources based on a determination that the set of beam-specific AUL resources is available for the AUL transmission. In some examples, AUL transmission component 835 may perform the AUL transmission using the set of AUL resources, where a first portion of the AUL transmission includes a sensing signal and a second portion of the AUL transmission includes the uplink data. In some cases, AUL transmission component 835 may perform the AUL transmission based on the received trigger signal.

In some cases, a first portion of the AUL transmission includes at least a sensing signal and a second portion of the AUL transmission includes the uplink data. In some examples, the first portion may be non-overlapping with a portion of a second set of AUL resources and the second portion may be at least partially overlapping with the second set of AUL resources, where the second set of AUL resources is specific to a second AUL receive beam of the base station 105. In some cases, performing the AUL transmission includes performing the AUL transmission with one or more repetitions of the uplink data on the set of AUL resources. In some examples, performing the AUL transmission includes performing the AUL transmission with one or more reference signals within the first portion of the AUL transmission, where the sensing signal may include the one or more reference signals. In some cases, the one or more reference signals include an SRS, or a DMRS, or a combination thereof.

In some examples, the first portion of the AUL transmission may be TDM with the second portion, and where the uplink data includes one or more additional reference signals. The sensing signal may include an AUL indicator that includes transmission information including an indication of a priority of the uplink data, a waveform for a PUSCH, an MCS, an RV, a time/frequency resource allocation for a subsequent data transmission, UE identity information, transmit beam information, an indication of a receive beam to be used to receive the AUL transmission, or a combination thereof. In some cases, the transmission information is at least partially carried through a scrambling code associated with the AUL indicator, an orthogonal cover code associated with the AUL indicator, a cyclic shift associated with the AUL indicator, a frequency comb associated with the AUL indicator, or a combination thereof.

Trigger signal manager 840 may receive, from the base station 105, a trigger signal associated with the set of beam-specific AUL resources. For example, trigger signal manager 840 may receive, in response to the transmitted sensing signal, a trigger signal including an indication that the set of AUL resources is available for AUL transmissions by the UE 115. In some cases, the trigger signal includes one or more of: RRC messaging, DCI, downlink messaging, a PDCCH, a reference signal, or signaling within a synchronization signal burst. In some cases, the PDCCH indicates a subset of AUL resources that is available within the set of beam-specific AUL resources. In some examples, the PDCCH indicates a second trigger signal associated with the set of beam-specific AUL resources, and where the second trigger signal is used to determine whether the set of beam-specific AUL resources is available for the AUL transmission by the UE 115. In some cases, the second trigger signal includes a reference signal, or signaling within a synchronization signal burst, or a combination thereof. In some cases, the trigger signal includes a sensing resource identifier, UE identity information, a beam identity, uplink resource allocation corresponding to a set of beams, a waveform to use for a PUSCH, or a combination thereof.

Decoder 845 may decode the trigger signal. AUL indicator component 850 may transmit an AUL indicator within the first portion of the AUL transmission, where the AUL indicator is multiplexed with the uplink data in the first portion of the AUL transmission. In some cases, the AUL indicator serves as DMRSs for the uplink data. In some cases, the AUL indicator includes transmission information including an indication of a priority of the uplink data, a waveform for a PUSCH, an MCS, an RV, a time/frequency resource allocation for a subsequent uplink data transmission, UE identity information, transmit beam information, an indication of a preferred receive beam to be used to receive AUL transmissions, or a combination thereof. In some cases, the transmission information is at least partially carried through a scrambling code associated with the AUL indicator, an orthogonal cover code associated with the AUL indicator, a cyclic shift associated with the AUL indicator, a frequency comb associated with the AUL indicator, or a combination thereof.

Figure 9:
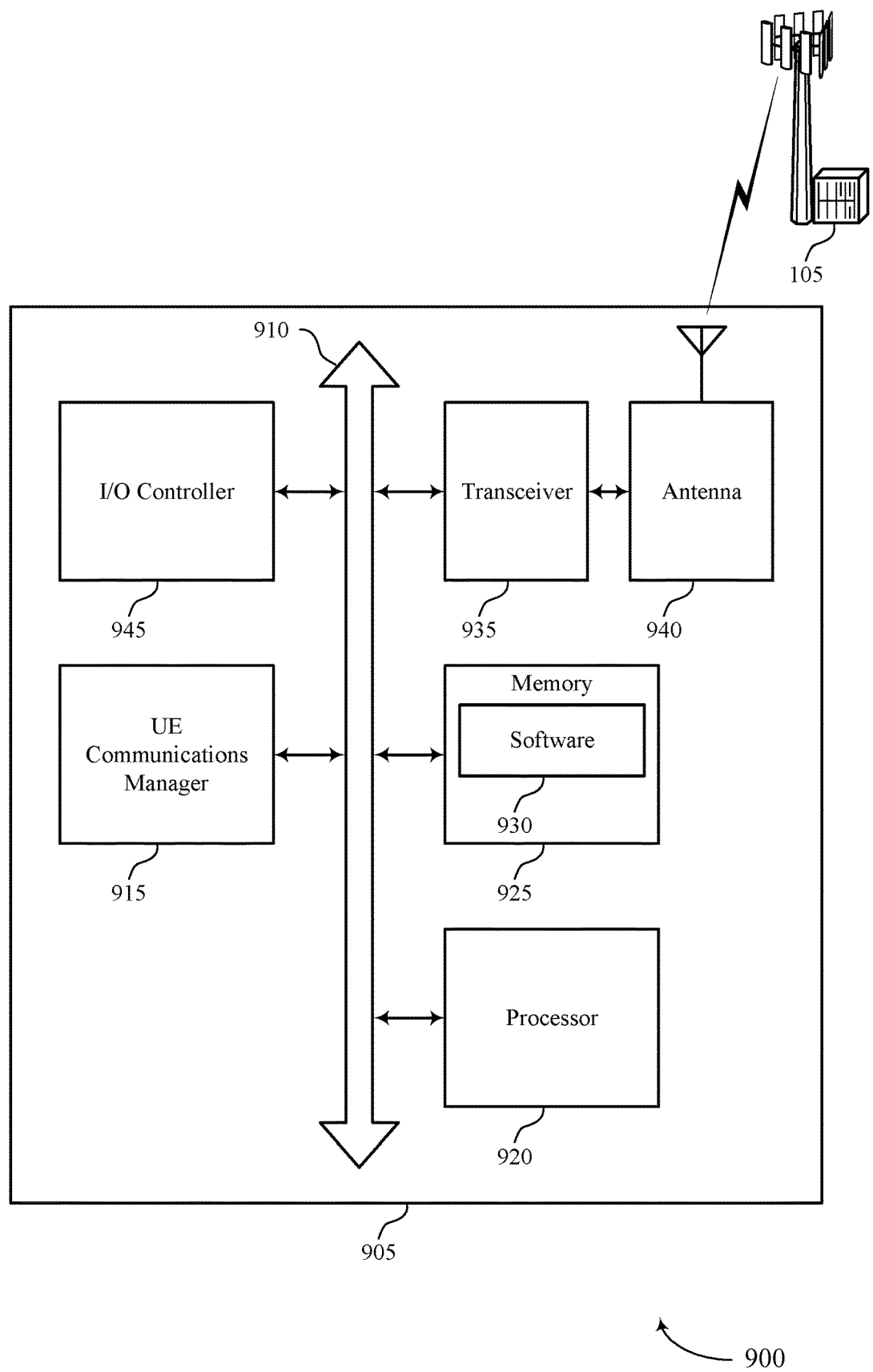
FIG. 9 illustrates a block diagram of a system including a user equipment (UE) that supports AUL with analog beams in accordance with aspects of the present disclosure.

FIG. 9 shows a diagram of a system 900 including a device 905 that supports AUL with analog beams in accordance with aspects of the present disclosure. Device 905 may be an example of or include the components of wireless device 605, wireless device 705, or a UE 115 as described herein, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting AUL with analog beams).

Memory 925 may include random-access memory (RAM) and read-only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support AUL with analog beams. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
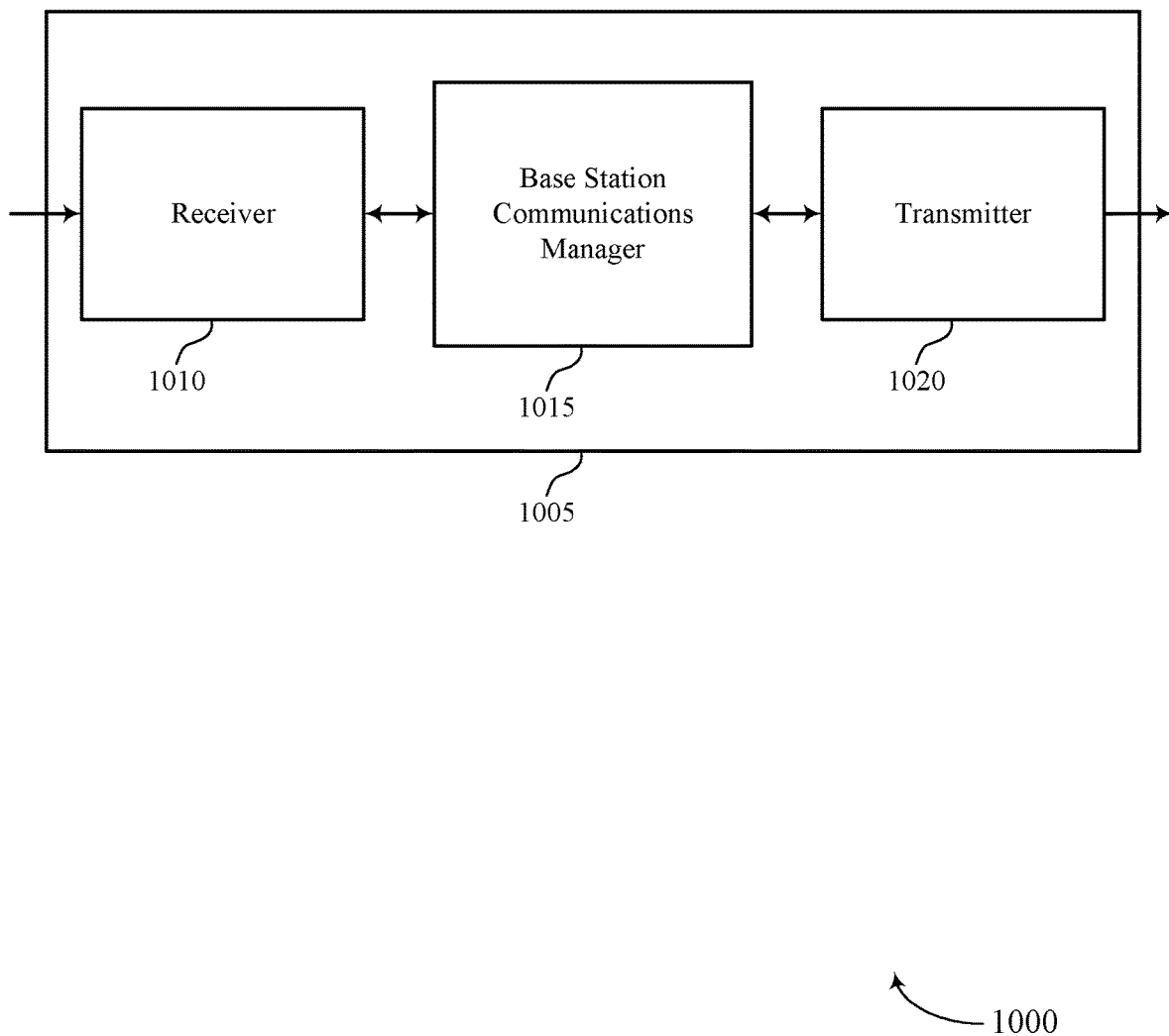
FIGS. 10 through 12 show block diagrams of a device that supports AUL with analog beams in accordance with aspects of the present disclosure.

FIG. 10 shows a block diagram 1000 of a wireless device 1005 that supports AUL with analog beams in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to AUL with analog beams, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a set of AUL resources for a UE 115, determine an AUL configuration for the set of AUL resources and one or more AUL receive beams of the base station, where the set of AUL resources is specific to an AUL receive beam of the base station 105, transmit, to the UE 115, the AUL configuration including an indication of the set of beam-specific AUL resources, and receive an AUL transmission from the UE 115 in accordance with the AUL configuration, where the AUL transmission is received using the set of beam-specific AUL resources and the AUL receive beam.

The base station communications manager 1015 may also transmit, to a UE 115, an AUL configuration including an indication of a set of AUL resources for the UE 115, receive, from the UE 115, an AUL transmission on the set of AUL resources, where a first portion of the AUL transmission includes a sensing signal and a second portion of the AUL transmission includes uplink data, and determine an AUL receive beam for receiving the second portion of the AUL transmission, the AUL receive beam corresponding to the set of AUL resources, where the AUL receive beam is determined based on the sensing signal.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
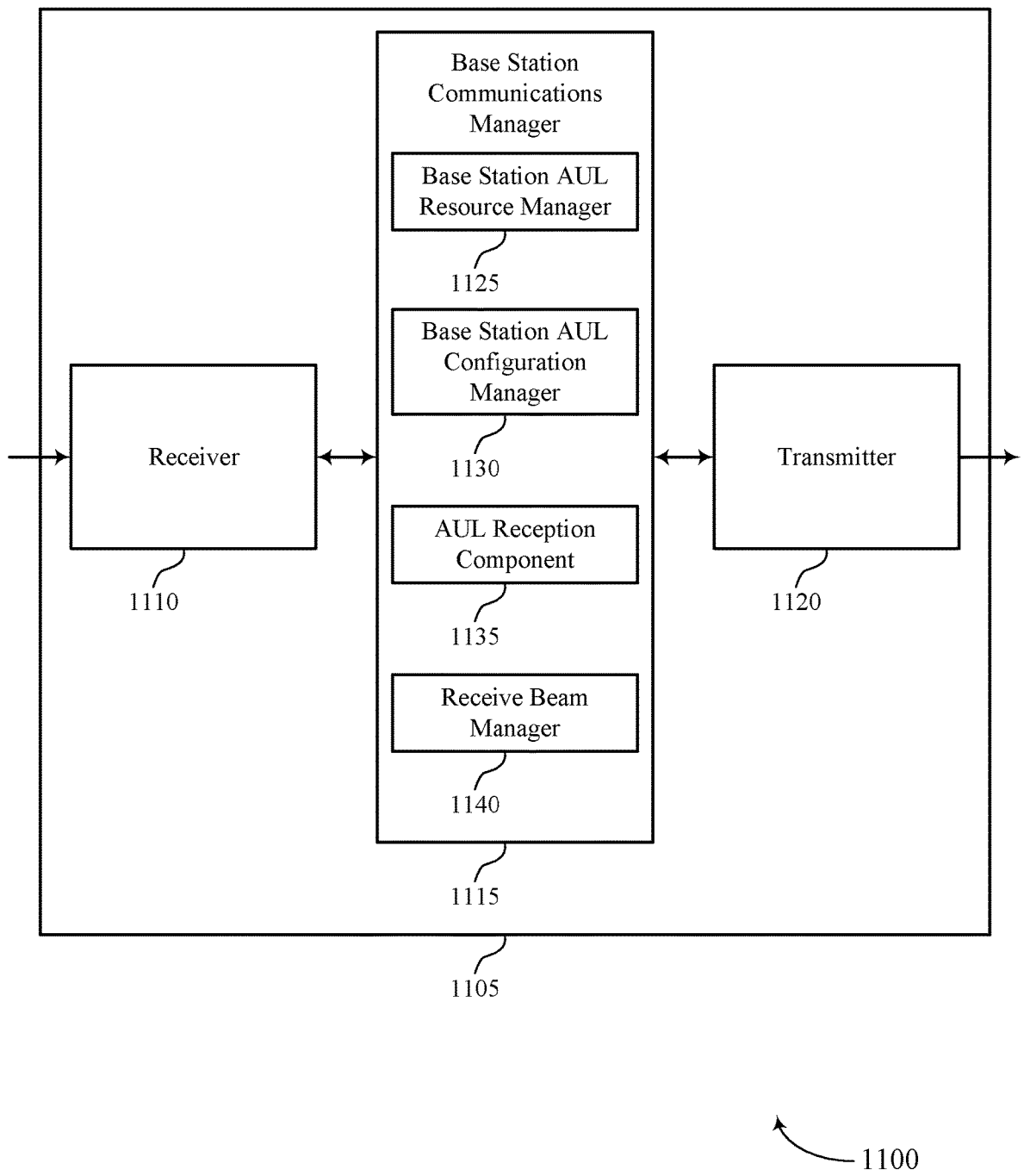

FIG. 11 shows a block diagram 1100 of a wireless device 1105 that supports AUL with analog beams in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to AUL with analog beams, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include base station AUL resource manager 1125, base station AUL configuration manager 1130, AUL reception component 1135, and receive beam manager 1140.

Base station AUL resource manager 1125 may identify a set of AUL resources for a UE 115 and determine that the set of beam-specific AUL resources are available for AUL transmissions by the UE 115. Base station AUL configuration manager 1130 may determine an AUL configuration for the set of AUL resources and one or more AUL receive beams of the base station 105, where the set of AUL resources is specific to an AUL receive beam of the base station 105. In some examples, base station AUL configuration manager 1130 may transmit, to the UE 115, the AUL configuration including an indication of the set of beam-specific AUL resources. In some cases, base station AUL configuration manager 1130 may configure the set of beam-specific AUL resources to be TDM (and non-overlapping) with a second set of AUL resources, where the second set of AUL resources is specific to a second AUL receive beam of the base station 105

Additionally or alternatively, base station AUL configuration manager 1130 may configure the set of beam-specific AUL resources to include a first portion and a second portion, the first portion being non-overlapping with a portion of a second set of AUL resources and the second portion at least partially overlapping with the second set of AUL resources, where the second set of AUL resources is specific to a second AUL receive beam of the base station 105. In some cases, base station AUL configuration manager 1130 may transmit, to the UE 115, an AUL configuration including an indication of a set of AUL resources for the UE 115. In some cases, transmitting the AUL configuration includes transmitting one or more of: an RRC message including the AUL configuration, DCI including the AUL configuration, or a trigger signal including the AUL configuration.

AUL reception component 1135 may receive an AUL transmission from the UE 115 in accordance with the AUL configuration, where the AUL transmission is received using the set of beam-specific AUL resources and the AUL receive beam. Additionally or alternatively, AUL reception component 1135 may receive, from the UE 115, an AUL transmission on the set of AUL resources, where a first portion of the AUL transmission includes a sensing signal and a second portion of the AUL transmission includes uplink data. In some cases, AUL reception component 1135 may receive the AUL transmission based on the transmitted trigger signal.

In some cases, the AUL transmission includes one or more repetitions of the uplink data on the set of AUL resources. In some examples, the sensing signal includes one or more reference signals transmitted within the first portion of the AUL transmission. In some cases, the first portion of the AUL transmission is TDM with the second portion, and where the uplink data includes one or more additional reference signals. In some cases, the sensing signal includes an AUL indicator that includes transmission information including an indication of a priority of the uplink data, a waveform for a PUSCH, an MCS, an RV, a time/frequency resource allocation for a subsequent data transmission, UE 115 identity information, transmit beam information, an indication of a receive beam to be used to receive the AUL transmission, or a combination thereof.

Receive beam manager 1140 may determine an AUL receive beam for receiving the second portion of the AUL transmission. In some cases, the AUL receive beam may correspond to the set of AUL resources, and the AUL receive beam may be determined based on the sensing signal, where determining the AUL receive beam for receiving the second portion of the AUL transmission is based on the monitoring.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
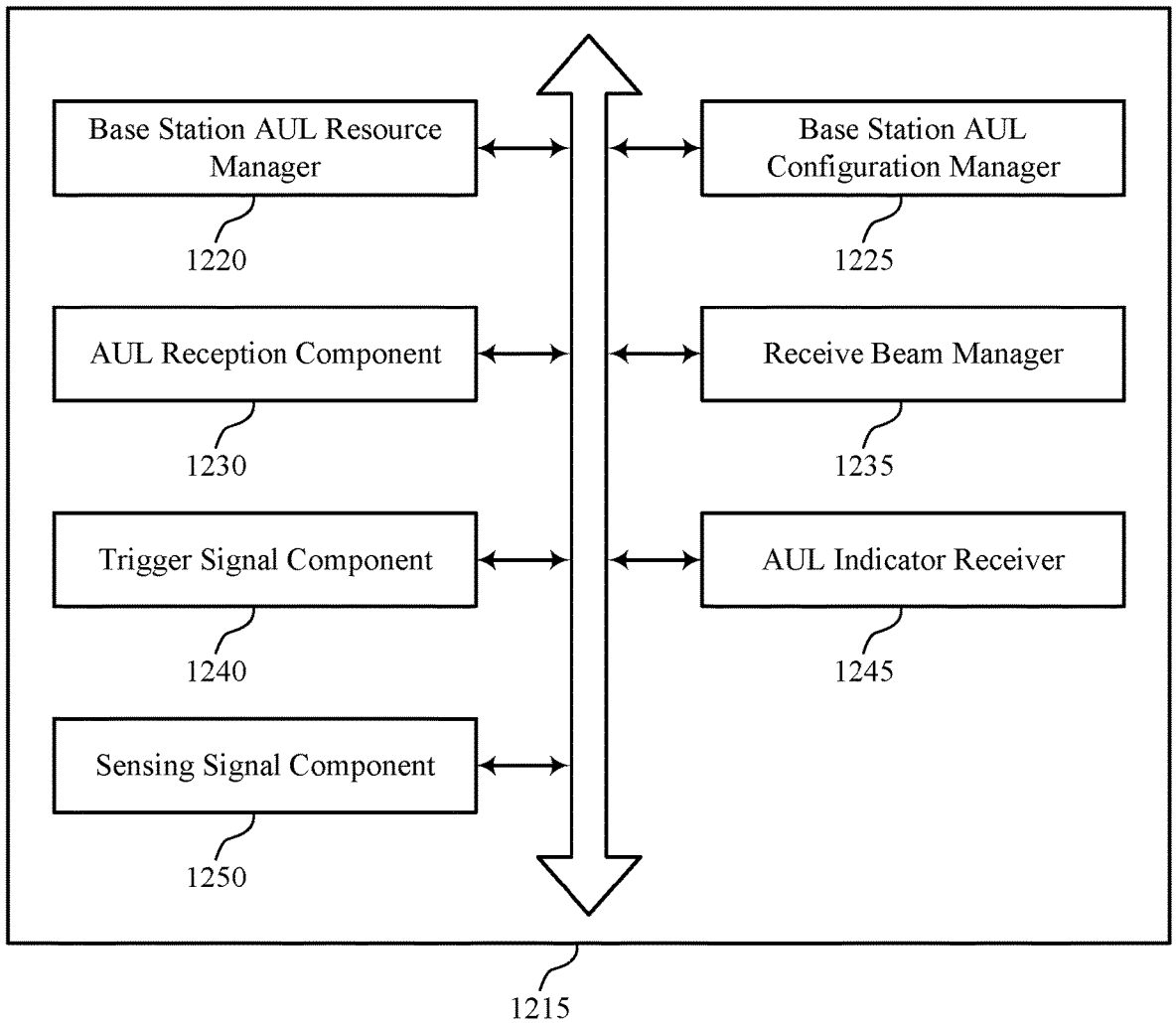

FIG. 12 shows a block diagram 1200 of a base station communications manager 1215 that supports AUL with analog beams in accordance with aspects of the present disclosure. The base station communications manager 1215 may be an example of aspects of a base station communications manager 1315 described with reference to FIGS. 10, 11, and 13. The base station communications manager 1215 may include base station AUL resource manager 1220, base station AUL configuration manager 1225, AUL reception component 1230, receive beam manager 1235, trigger signal component 1240, AUL indicator receiver 1245, and sensing signal component 1250. Each of these modules may communicate, directly or indirectly, with one another (e.g., via one or more buses).

Base station AUL resource manager 1220 may identify a set of AUL resources for a UE 115 and determine that the set of beam-specific AUL resources are available for AUL transmissions by the UE 115. Base station AUL configuration manager 1225 may determine an AUL configuration for the set of AUL resources and one or more AUL receive beams of the base station 105, where the set of AUL resources is specific to an AUL receive beam of the base station 105. In some examples, base station AUL configuration manager 1225 may transmit, to the UE 115, the AUL configuration including an indication of the set of beam-specific AUL resources. In some cases, base station AUL configuration manager 1225 may configure the set of beam-specific AUL resources to be TDM (and non-overlapping) with a second set of AUL resources, where the second set of AUL resources is specific to a second AUL receive beam of the base station 105

Additionally or alternatively, base station AUL configuration manager 1225 may configure the set of beam-specific AUL resources to include a first portion and a second portion, the first portion being non-overlapping with a portion of a second set of AUL resources and the second portion at least partially overlapping with the second set of AUL resources, where the second set of AUL resources is specific to a second AUL receive beam of the base station 105. In some cases, base station AUL configuration manager 1225 may transmit, to the UE 115, an AUL configuration including an indication of a set of AUL resources for the UE 115. In some cases, transmitting the AUL configuration includes transmitting one or more of: an RRC message including the AUL configuration, DCI including the AUL configuration, or a trigger signal including the AUL configuration.

AUL reception component 1230 may receive an AUL transmission from the UE 115 in accordance with the AUL configuration, where the AUL transmission is received using the set of beam-specific AUL resources and the AUL receive beam. Additionally or alternatively, AUL reception component 1230 may receive, from the UE 115, an AUL transmission on the set of AUL resources, where a first portion of the AUL transmission includes a sensing signal and a second portion of the AUL transmission includes uplink data. In some cases, AUL reception component 1230 may receive the AUL transmission based on the transmitted trigger signal.

In some cases, the AUL transmission includes one or more repetitions of the uplink data on the set of AUL resources. In some examples, the sensing signal includes one or more reference signals transmitted within the first portion of the AUL transmission. In some cases, the first portion of the AUL transmission is TDM with the second portion, and the uplink data includes one or more additional reference signals. In some cases, the sensing signal includes an AUL indicator that includes transmission information including an indication of a priority of the uplink data, a waveform for a PUSCH, an MCS, an RV, a time/frequency resource allocation for a subsequent data transmission, UE 115 identity information, transmit beam information, an indication of a receive beam to be used to receive the AUL transmission, or a combination thereof.

Receive beam manager 1235 may determine an AUL receive beam for receiving the second portion of the AUL transmission, the AUL receive beam corresponding to the set of AUL resources. In some cases, the AUL receive beam is determined based on the sensing signal and determining the AUL receive beam for receiving the second portion of the AUL transmission is based on the monitoring.

Trigger signal component 1240 may transmit a trigger signal including an indication that the set of beam-specific AUL resources are available for the AUL transmissions based on the determination that the set of beam-specific AUL resources are available. Trigger signal component 1240 may transmit the trigger signal using a transmit beam corresponding to the AUL receive beam. In some cases, trigger signal component 1240 may transmit, within the AUL configuration, a trigger signal configuration, where the trigger signal configuration includes an indication of time/frequency resources associated with a trigger signal and information for processing the trigger signal. In some examples, trigger signal component 1240 may transmit, in response to the received sensing signal, a trigger signal including an indication that the set of AUL resources are available for AUL transmissions.

In some cases, the trigger signal includes RRC messaging, DCI, downlink messaging, a PDCCH, a reference signal, a synchronization signal burst, or a combination thereof. In some cases, the trigger signal is transmitted using a transmit beam that corresponds to the AUL receive beam for receiving the second portion of the AUL transmission. In some cases, the trigger signal includes a sensing resource identifier, UE identity information, a beam identity, uplink resource allocation corresponding to a set of beams, a waveform to use for a PUSCH, or a combination thereof.

AUL indicator receiver 1245 may receive, from the UE 115, an AUL indicator within the first portion of the AUL transmission, where the AUL indicator is multiplexed with the uplink data in the first portion of the set of beam-specific AUL resources. In some cases, the AUL indicator includes an indication of a priority of the uplink data, a waveform for a PUSCH, an MCS, an RV, a time/frequency resource allocation for a subsequent uplink data transmission, UE identity information, transmit beam information, an indication of a preferred receive beam to be used to receive AUL transmissions, or a combination thereof.

Sensing signal component 1250 may monitor for one or more sensing signals corresponding to a set of AUL beams, where a set of beam directions are monitored in the first portion of the AUL transmission. Additionally or alternatively, sensing signal component 1250 may monitor for one or more sensing signals corresponding to a set of AUL beams, where a different beam direction is monitored in respective TDM portions of the AUL transmission.

Figure 13:
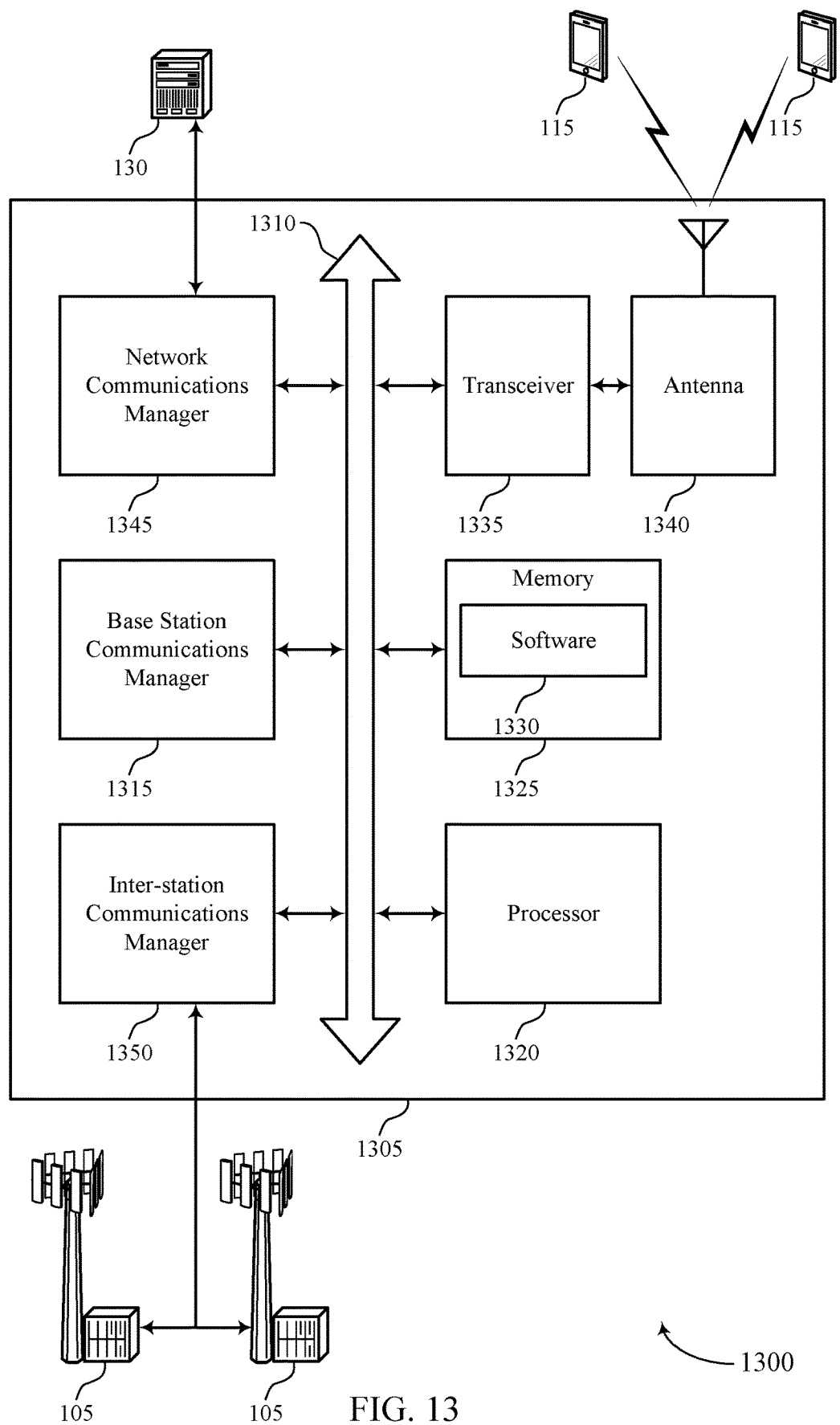
FIG. 13 illustrates a block diagram of a system including a base station that supports AUL with analog beams in accordance with aspects of the present disclosure.

FIG. 13 shows a diagram of a system 1300 including a device 1305 that supports AUL with analog beams in accordance with aspects of the present disclosure. Device 1305 may be an example of or include the components of base station 105 as described herein, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting AUL with analog beams).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support AUL with analog beams. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105 and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within a Long Term Evolution (LTE)/LTE-A wireless communication network technology to provide communication between base stations 105.

Figure 14:
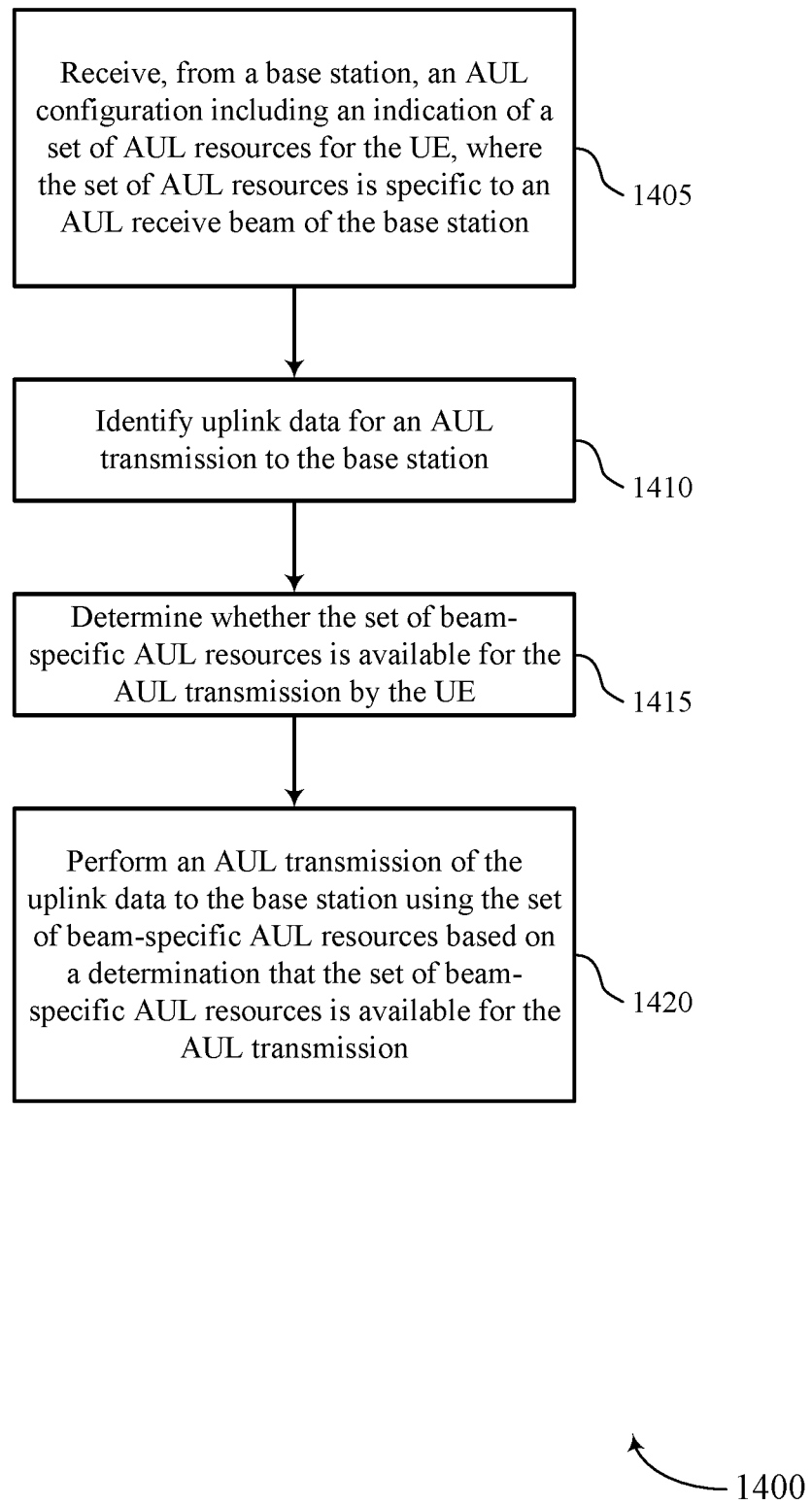
FIGS. 14 through 19 illustrate methods for AUL with analog beams in accordance with aspects of the present disclosure.

FIG. 14 shows a flowchart illustrating a method 1400 for AUL with analog beams in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, the UE 115 may execute a set of codes to control the functional elements of the device to perform the functions described herein. Additionally or alternatively, the UE 115 may perform aspects of the functions described herein using special-purpose hardware.

At 1405 the UE 115 may receive, from a base station 105, an AUL configuration including an indication of a set of AUL resources for the UE 115, where the set of AUL resources is specific to an AUL receive beam of the base station 105. The operations of 1405 may be performed according to the methods described herein. In certain examples, aspects of the operations of 1405 may be performed by a UE AUL configuration manager as described with reference to FIGS. 6 through 9.

At 1410 the UE 115 may identify uplink data for an AUL transmission to the base station 105. The operations of 1410 may be performed according to the methods described herein. In certain examples, aspects of the operations of 1410 may be performed by a data manager as described with reference to FIGS. 6 through 9.

At 1415 the UE 115 may determine whether the set of beam-specific AUL resources is available for the AUL transmission by the UE 115. The operations of 1415 may be performed according to the methods described herein. In certain examples, aspects of the operations of 1415 may be performed by a UE AUL resource manager as described with reference to FIGS. 6 through 9.

At 1420 the UE 115 may perform an AUL transmission of the uplink data to the base station 105 using the set of beam-specific AUL resources based at least in part on a determination that the set of beam-specific AUL resources is available for the AUL transmission. The operations of 1420 may be performed according to the methods described herein. In certain examples, aspects of the operations of 1420 may be performed by an AUL transmission component as described with reference to FIGS. 6 through 9.

Figure 15:
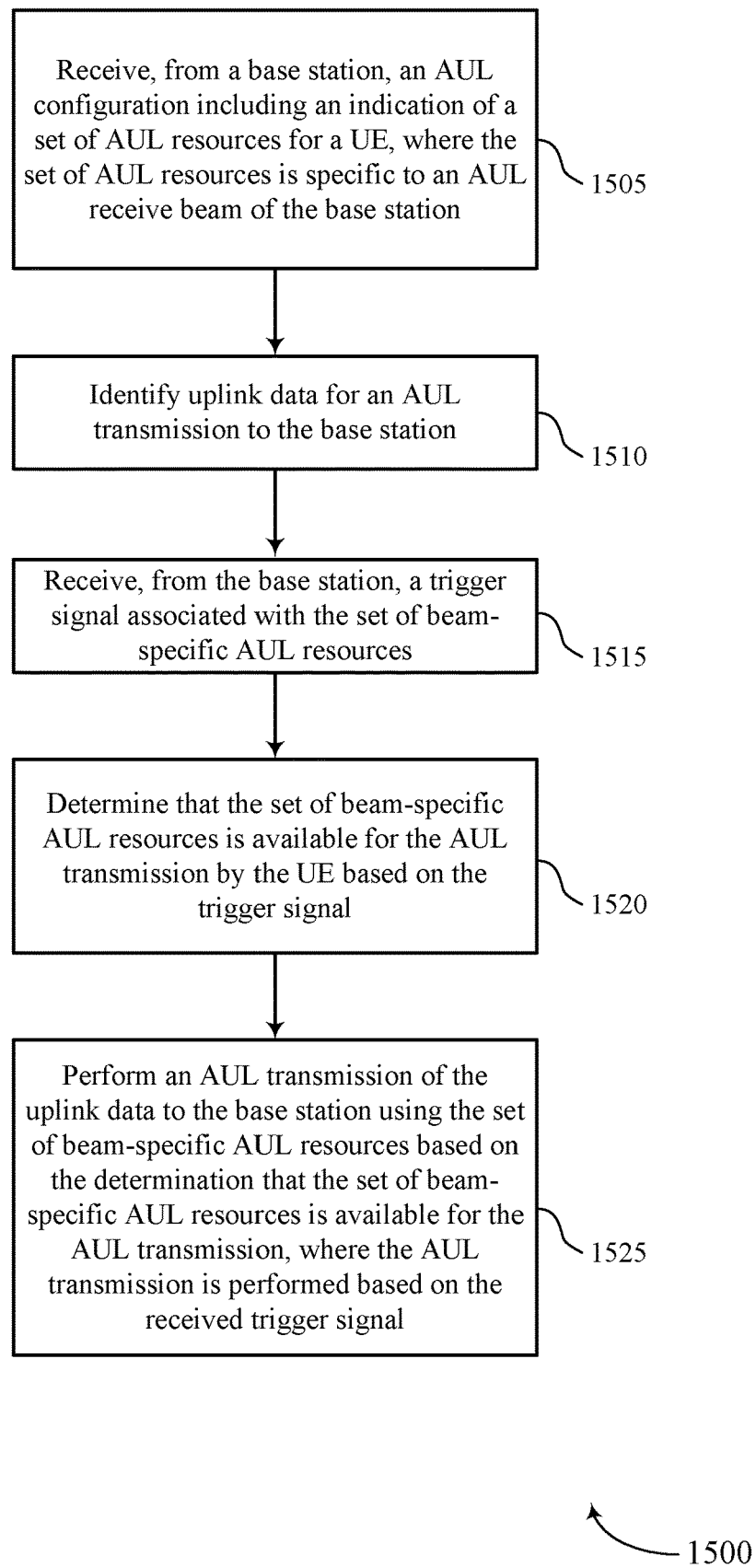

FIG. 15 shows a flowchart illustrating a method 1500 for AUL with analog beams in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may receive, from a base station 105, an AUL configuration including an indication of a set of AUL resources for the UE 115, where the set of AUL resources is specific to an AUL receive beam of the base station 105. The operations of 1505 may be performed according to the methods described herein. In certain examples, aspects of the operations of 1505 may be performed by a UE AUL configuration manager as described with reference to FIGS. 6 through 9.

At 1510 the UE 115 may identify uplink data for an AUL transmission to the base station 105. The operations of 1510 may be performed according to the methods described herein. In certain examples, aspects of the operations of 1510 may be performed by a data manager as described with reference to FIGS. 6 through 9.

At 1515 the UE 115 may receive, from the base station 105, a trigger signal associated with the set of beam-specific AUL resources. The operations of 1515 may be performed according to the methods described herein. In certain examples, aspects of the operations of 1515 may be performed by a trigger signal manager as described with reference to FIGS. 6 through 9.

At 1520 the UE 115 may determine that the set of beam-specific AUL resources is available for the AUL transmission by the UE 115 based at least in part on the trigger signal, where the AUL transmission is performed based on the received trigger signal. The operations of 1520 may be performed according to the methods described herein. In certain examples, aspects of the operations of 1520 may be performed by a UE AUL resource manager as described with reference to FIGS. 6 through 9.

At 1525 the UE 115 may perform an AUL transmission of the uplink data to the base station 105 using the set of beam-specific AUL resources based at least in part on a determination that the set of beam-specific AUL resources is available for the AUL transmission. The operations of 1525 may be performed according to the methods described herein. In certain examples, aspects of the operations of 1525 may be performed by an AUL transmission component as described with reference to FIGS. 6 through 9.

Figure 16:
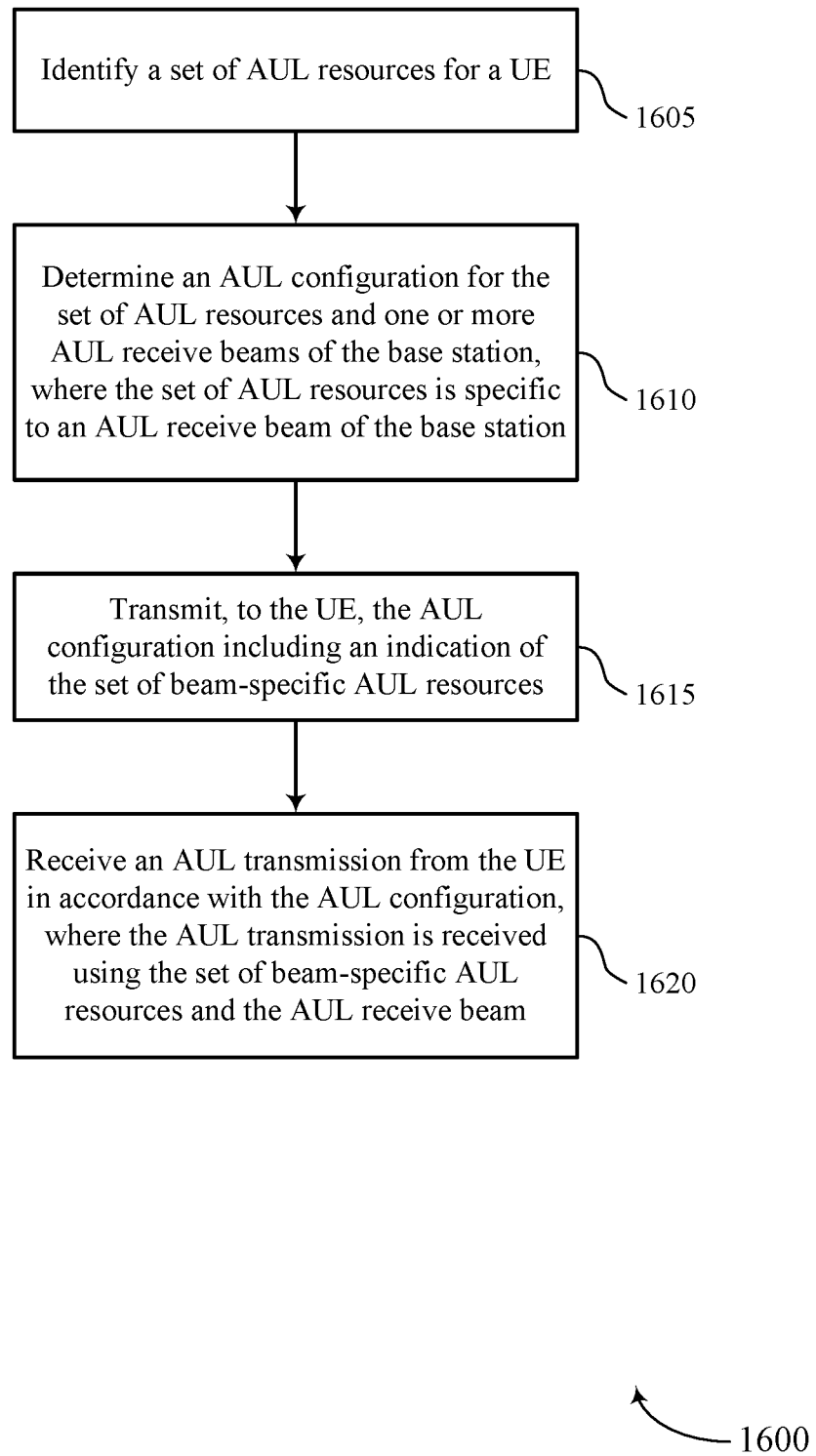

FIG. 16 shows a flowchart illustrating a method 1600 for AUL with analog beams in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1605 the base station 105 may identify a set of AUL resources for a UE 115. The operations of 1605 may be performed according to the methods described herein. In certain examples, aspects of the operations of 1605 may be performed by a base station AUL resource manager as described with reference to FIGS. 10 through 13.

At 1610 the base station 105 may determine an AUL configuration for the set of AUL resources and one or more AUL receive beams of the base station 105, where the set of AUL resources is specific to an AUL receive beam of the base station 105. The operations of 1610 may be performed according to the methods described herein. In certain examples, aspects of the operations of 1610 may be performed by the base station AUL configuration manager as described with reference to FIGS. 10 through 13.

At 1615 the base station 105 may transmit, to the UE 115, the AUL configuration including an indication of the set of beam-specific AUL resources. The operations of 1615 may be performed according to the methods described herein. In certain examples, aspects of the operations of 1615 may be performed by a base station AUL configuration manager as described with reference to FIGS. 10 through 13.

At 1620 the base station 105 may receive an AUL transmission from the UE 115 in accordance with the AUL configuration, where the AUL transmission is received using the set of beam-specific AUL resources and the AUL receive beam. The operations of 1620 may be performed according to the methods described herein. In certain examples, aspects of the operations of 1620 may be performed by an AUL reception component as described with reference to FIGS. 10 through 13.

Figure 17:
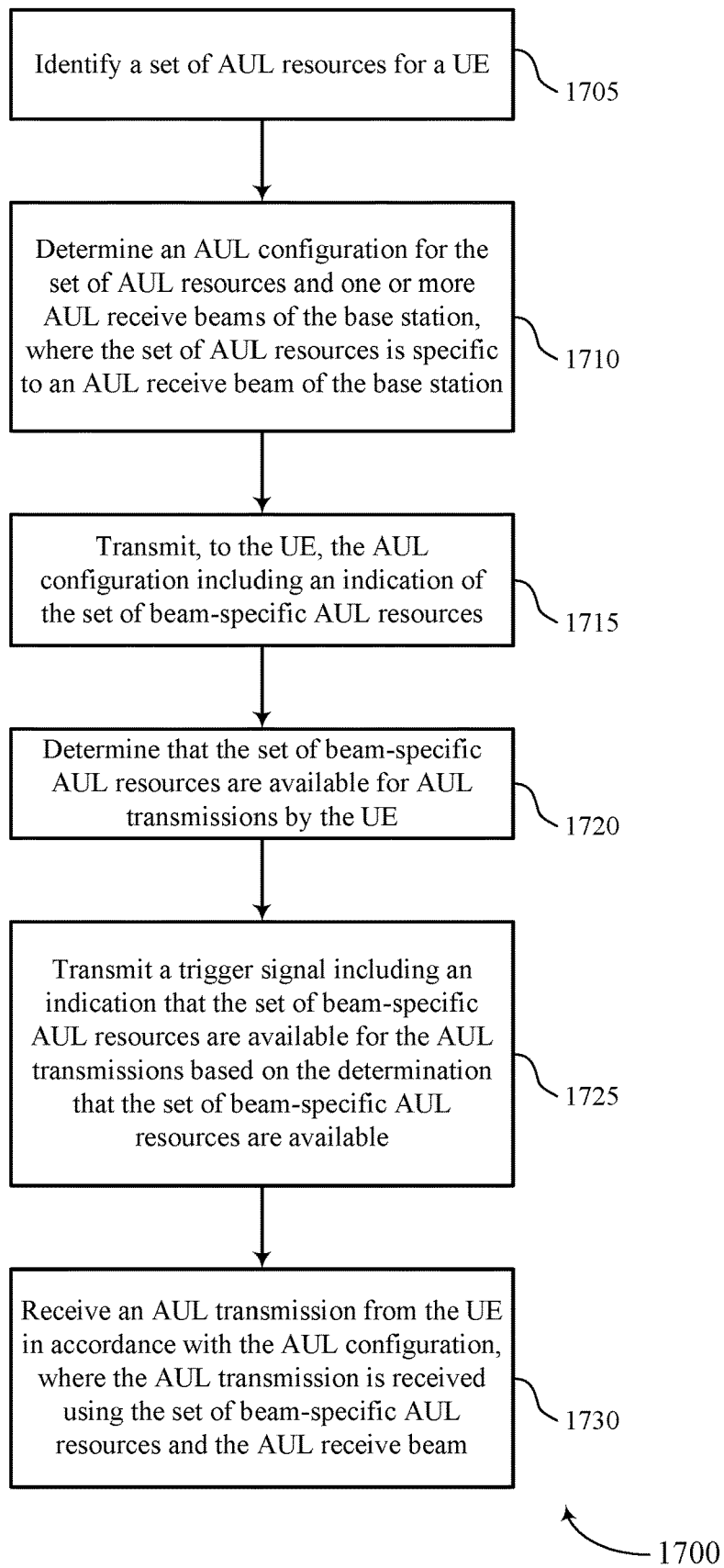

FIG. 17 shows a flowchart illustrating a method 1700 for AUL with analog beams in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1705 the base station 105 may identify a set of AUL resources for a UE 115. The operations of 1705 may be performed according to the methods described herein. In certain examples, aspects of the operations of 1705 may be performed by a base station AUL resource manager as described with reference to FIGS. 10 through 13.

At 1710 the base station 105 may determine an AUL configuration for the set of AUL resources and one or more AUL receive beams of the base station 105, where the set of AUL resources is specific to an AUL receive beam of the base station 105. The operations of 1710 may be performed according to the methods described herein. In certain examples, aspects of the operations of 1710 may be performed by a base station AUL configuration manager as described with reference to FIGS. 10 through 13.

At 1715 the base station 105 may transmit, to the UE 115, the AUL configuration including an indication of the set of beam-specific AUL resources. The operations of 1715 may be performed according to the methods described herein. In certain examples, aspects of the operations of 1715 may be performed by a base station AUL configuration manager as described with reference to FIGS. 10 through 13.

At 1720 the base station 105 may determine that the set of beam-specific AUL resources are available for AUL transmissions by the UE 115. The operations of 1720 may be performed according to the methods described herein. In certain examples, aspects of the operations of 1720 may be performed by a base station AUL resource manager as described with reference to FIGS. 10 through 13.

At 1725 the base station 105 may transmit a trigger signal including an indication that the set of beam-specific AUL resources are available for the AUL transmissions based at least in part on the determination that the set of beam-specific AUL resources are available. The operations of 1725 may be performed according to the methods described herein. In certain examples, aspects of the operations of 1725 may be performed by a trigger signal component as described with reference to FIGS. 10 through 13.

At 1730 the base station 105 may receive an AUL transmission from the UE 115 in accordance with the AUL configuration, where the AUL transmission is received using the set of beam-specific AUL resources and the AUL receive beam. The operations of 1730 may be performed according to the methods described herein. In certain examples, aspects of the operations of 1730 may be performed by an AUL reception component as described with reference to FIGS. 10 through 13.

Figure 18:
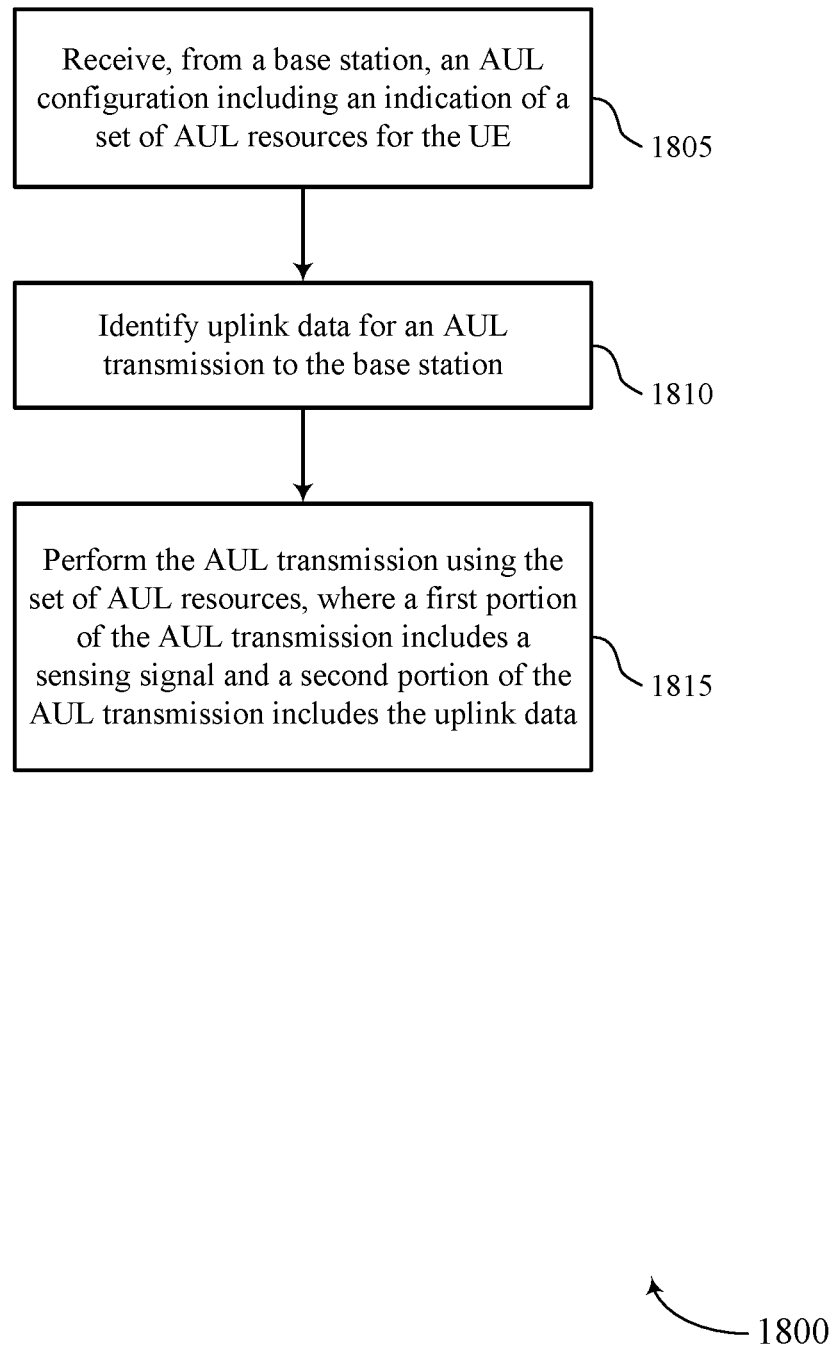

FIG. 18 shows a flowchart illustrating a method 1800 for AUL with analog beams in accordance with aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1805 the UE 115 may receive, from a base station 105, an AUL configuration including an indication of a set of AUL resources for the UE 115. The operations of 1805 may be performed according to the methods described herein. In certain examples, aspects of the operations of 1805 may be performed by a UE AUL configuration manager as described with reference to FIGS. 6 through 9.

At 1810 the UE 115 may identify uplink data for an AUL transmission to the base station 105. The operations of 1810 may be performed according to the methods described herein. In certain examples, aspects of the operations of 1810 may be performed by a data manager as described with reference to FIGS. 6 through 9.

At 1815 the UE 115 may perform the AUL transmission using the set of AUL resources, where a first portion of the AUL transmission comprises a sensing signal and a second portion of the AUL transmission comprises the uplink data. The operations of 1815 may be performed according to the methods described herein. In certain examples, aspects of the operations of 1815 may be performed by a AUL transmission component as described with reference to FIGS. 6 through 9.

Figure 19:
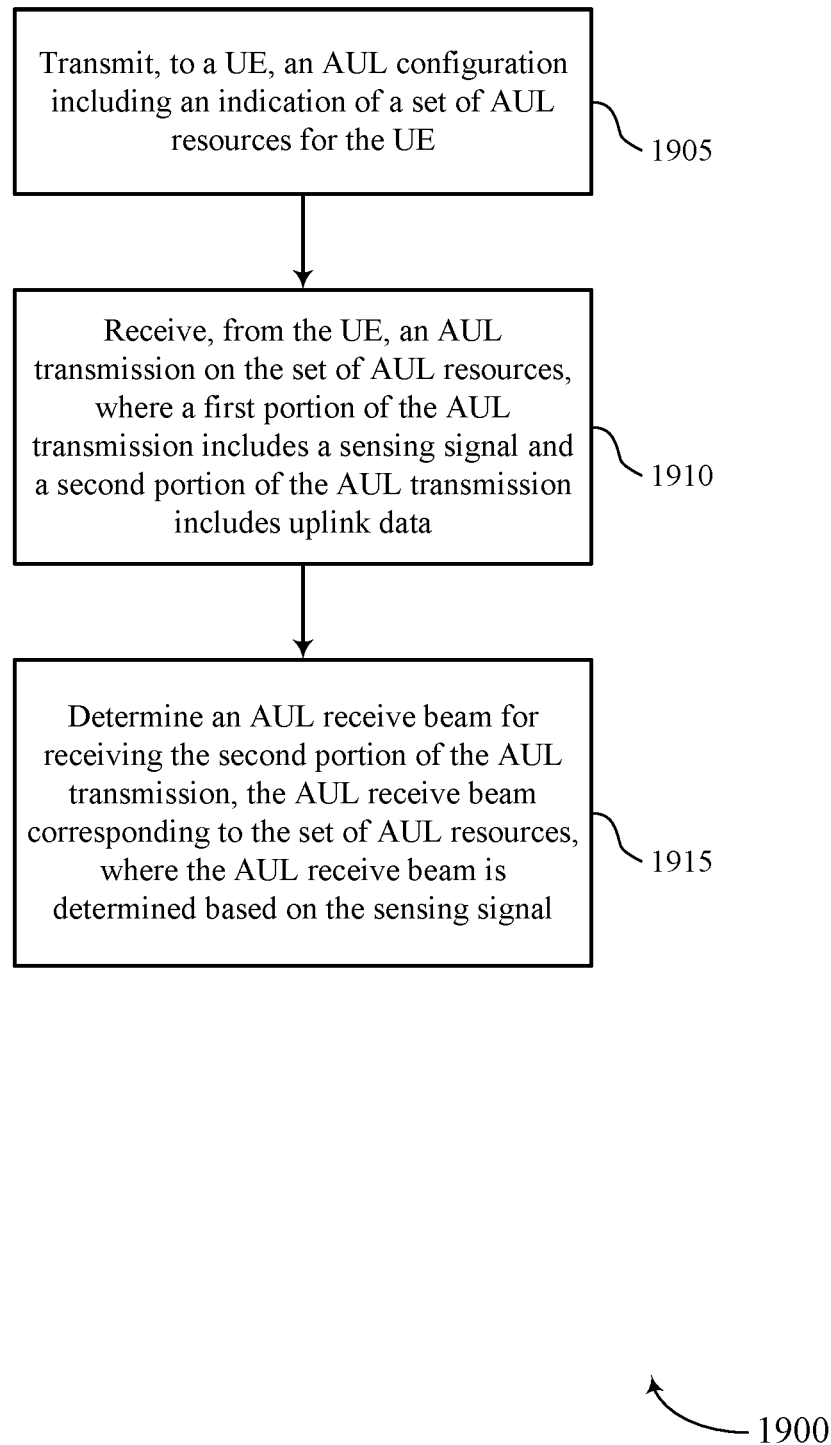

FIG. 19 shows a flowchart illustrating a method 1900 for AUL with analog beams in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1905 the base station 105 may transmit, to a UE 115, an AUL configuration including an indication of a set of AUL resources for the UE 115. The operations of 1905 may be performed according to the methods described herein. In certain examples, aspects of the operations of 1905 may be performed by a base station AUL configuration manager as described with reference to FIGS. 10 through 13.

At 1910 the base station 105 may receive, from the UE 115, an AUL transmission on the set of AUL resources, where a first portion of the AUL transmission comprises a sensing signal and a second portion of the AUL transmission comprises uplink data. The operations of 1910 may be performed according to the methods described herein. In certain examples, aspects of the operations of 1910 may be performed by an AUL reception component as described with reference to FIGS. 10 through 13.

At 1915 the base station 105 may determine an AUL receive beam for receiving the second portion of the AUL transmission, the AUL receive beam corresponding to the set of AUL resources, where the AUL receive beam is determined based at least in part on the sensing signal. The operations of 1915 may be performed according to the methods described herein. In certain examples, aspects of the operations of 1915 may be performed by a receive beam manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of a LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, from a network entity, an autonomous uplink (AUL) configuration comprising an indication of a set of AUL resources for the UE;
identifying uplink data for an AUL transmission to the network entity; and
performing the AUL transmission using the set of AUL resources, wherein a first portion of the AUL transmission comprises a sensing signal including one or more reference signals, and wherein a second portion of the AUL transmission comprises the uplink data including one or more additional reference signals, wherein the AUL transmission is performed with the one or more reference signals, and wherein the first portion of the AUL transmission is time division multiplexed (TDM) with the second portion.

2. The method of claim 1, wherein performing the AUL transmission comprises:
performing the AUL transmission with one or more repetitions of the uplink data on the set of AUL resources.

3. The method of claim 1, wherein the one or more reference signals comprise a sounding reference signal (SRS), or a demodulation reference signal (DMRS), or a combination thereof.

4. The method of claim 1, further comprising:
receiving, in response to the transmitted sensing signal, a trigger signal comprising a second indication that the set of AUL resources is available for AUL transmissions by the UE; and
performing the AUL transmission based at least in part on the received trigger signal.

5. The method of claim 4, wherein the trigger signal comprises a sensing resource identifier, UE identify information, a beam identity, uplink resource allocation corresponding to a set of beams, a waveform to use for a physical uplink shared channel (PUSCH), or a combination thereof.

6. The method of claim 1, wherein the sensing signal comprises an AUL indicator that includes transmission information including an indication of a priority of the uplink data, a waveform for a physical uplink shared channel (PUSCH), a modulation and coding scheme (MCS), a redundancy version (RV), a time/frequency resource allocation for a subsequent data transmission, UE identity information, transmit beam information, an indication of a receive beam to be used to receive the AUL transmission, or a combination thereof.

7. The method of claim 6, wherein the transmission information is at least partially carried through a scrambling code associated with the AUL indicator, an orthogonal cover code associated with the AUL indicator, a cyclic shift associated with the AUL indicator, a frequency comb associated with the AUL indicator, or a combination thereof.

8. An apparatus for wireless communication at a user equipment (UE), comprising:
a processor;
memory coupled with the processor; and
instructions stored in the memory and executable by the processor to cause the apparatus to:
receive, from a network entity, an autonomous uplink (AUL) configuration comprising an indication of a set of AUL resources for the UE;
identify uplink data for an AUL transmission to the network entity; and
perform the AUL transmission using the set of AUL resources, wherein a first portion of the AUL transmission comprises a sensing signal including one or more reference signals, and wherein a second portion of the AUL transmission comprises the uplink data including one or more additional reference signals, wherein the AUL transmission is performed with the one or more reference signals, and wherein the first portion of the AUL transmission is time division multiplexed (TDM) with the second portion.

9. The apparatus of claim 8, wherein the instructions to perform the AUL transmission are executable by the processor to cause the apparatus to:
perform the AUL transmission with one or more repetitions of the uplink data on the set of AUL resources.

10. The apparatus of claim 8, wherein the one or more reference signals comprise a sounding reference signal (SRS), or a demodulation reference signal (DMRS), or a combination thereof.

11. The apparatus of claim 8, wherein the instructions are further executable by the processor to cause the apparatus to:
receive, in response to the transmitted sensing signal, a trigger signal comprising a second indication that the set of AUL resources is available for AUL transmissions by the UE; and
perform the AUL transmission based at least in part on the received trigger signal.

12. The apparatus of claim 11, wherein the trigger signal comprises a sensing resource identifier, UE identify information, a beam identity, uplink resource allocation corresponding to a set of beams, a waveform to use for a physical uplink shared channel (PUSCH), or a combination thereof.

13. The apparatus of claim 8, wherein the sensing signal comprises an AUL indicator that includes transmission information including an indication of a priority of the uplink data, a waveform for a physical uplink shared channel (PUSCH), a modulation and coding scheme (MCS), a redundancy version (RV), a time/frequency resource allocation for a subsequent data transmission, UE identity information, transmit beam information, an indication of a receive beam to be used to receive the AUL transmission, or a combination thereof.

14. The apparatus of claim 13, wherein the transmission information is at least partially carried through a scrambling code associated with the AUL indicator, an orthogonal cover code associated with the AUL indicator, a cyclic shift associated with the AUL indicator, a frequency comb associated with the AUL indicator, or a combination thereof.

15. An apparatus for wireless communication at a user equipment (UE), comprising:
means for receiving, from a network entity, an autonomous uplink (AUL) configuration comprising an indication of a set of AUL resources for the UE;
means for identifying uplink data for an AUL transmission to the network entity; and
means for performing the AUL transmission using the set of AUL resources, wherein a first portion of the AUL transmission comprises a sensing signal including one or more reference signals, and wherein a second portion of the AUL transmission comprises the uplink data including one or more additional reference signals, wherein the AUL transmission is performed with the one or more reference signals, and wherein the first portion of the AUL transmission is time division multiplexed (TDM) with the second portion.

16. The apparatus of claim 15, wherein the means for performing the AUL transmission comprise:
means for performing the AUL transmission with one or more repetitions of the uplink data on the set of AUL resources.

17. The apparatus of claim 15, wherein:
the one or more reference signals comprise a sounding reference signal (SRS), or a demodulation reference signal (DMRS), or a combination thereof.

18. The apparatus of claim 15, further comprising:
means for receiving, in response to the transmitted sensing signal, a trigger signal comprising a second indication that the set of AUL resources is available for AUL transmissions by the UE; and means for performing the AUL transmission based at least in part on the received trigger signal.

19. The apparatus of claim 18, wherein the trigger signal comprises a sensing resource identifier, UE identify information, a beam identity, uplink resource allocation corresponding to a set of beams, a waveform to use for a physical uplink shared channel (PUSCH), or a combination thereof.

20. The apparatus of claim 15, wherein the sensing signal comprises an AUL indicator that includes transmission information including an indication of a priority of the uplink data, a waveform for a physical uplink shared channel (PUSCH), a modulation and coding scheme (MCS), a redundancy version (RV), a time/frequency resource allocation for a subsequent data transmission, UE identity information, transmit beam information, an indication of a receive beam to be used to receive the AUL transmission, or a combination thereof.

21. The apparatus of claim 20, wherein the transmission information is at least partially carried through a scrambling code associated with the AUL indicator, an orthogonal cover code associated with the AUL indicator, a cyclic shift associated with the AUL indicator, a frequency comb associated with the AUL indicator, or a combination thereof.

22. A non-transitory computer-readable medium storing code for wireless communication at a user equipment (UE), the code comprising instructions executable by a processor to:

receive, from a network entity, an autonomous uplink (AUL) configuration comprising an indication of a set of AUL resources for the UE;
identify uplink data for an AUL transmission to the network entity; and
perform the AUL transmission using the set of AUL resources, wherein a first portion of the AUL transmission comprises a sensing signal including one or more reference signals, and wherein a second portion of the AUL transmission comprises the uplink data including one or more additional reference signals, wherein the AUL transmission is performed with the one or more reference signals, and wherein the first portion of the AUL transmission is time division multiplexed (TDM) with the second portion.

23. The non-transitory computer-readable medium of claim 22, wherein the instructions to perform the AUL transmission are executable by the processor to:
perform the AUL transmission with one or more repetitions of the uplink data on the set of AUL resources.

24. The non-transitory computer-readable medium of claim 22, wherein the instructions to perform the AUL transmission are executable by the processor to:
perform the AUL transmission with the one or more reference signals within the first portion of the AUL transmission, the sensing signal comprising the one or more reference signals.

* * * * *